United States Patent
Aridome et al.

(10) Patent No.: US 7,609,901 B2
(45) Date of Patent: Oct. 27, 2009

(54) RECORDING/REPRODUCING SYSTEM

(75) Inventors: Kenichiro Aridome, Kanagawa (JP); Osamu Date, Saitama (JP); Akihiro Sagisaka, Aichi (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 10/557,487

(22) PCT Filed: Mar. 24, 2004

(86) PCT No.: PCT/JP2004/004005

§ 371 (c)(1),
(2), (4) Date: Nov. 21, 2005

(87) PCT Pub. No.: WO2004/110061

PCT Pub. Date: Dec. 16, 2004

(65) Prior Publication Data
US 2007/0035639 A1 Feb. 15, 2007

(30) Foreign Application Priority Data
Jun. 3, 2003 (JP) .............................. 2003-158472

(51) Int. Cl.
*G06K 9/46* (2006.01)
(52) U.S. Cl. .................. 382/236; 382/232; 382/312; 382/233
(58) Field of Classification Search ............... 382/232, 382/312, 321, 236, 233; 356/479, 497; 386/95, 386/125, E9.013; 348/231.3
See application file for complete search history.

(56) References Cited
U.S. PATENT DOCUMENTS
5,642,285 A 6/1997 Woo et al. ................ 701/213

| | | | |
|---|---|---|---|
| 6,198,540 B1 * | 3/2001 | Ueda et al. .................. 356/479 |
| 6,275,529 B1 | 8/2001 | Sato ...................... 375/240.01 |
| 6,437,797 B1 | 8/2002 | Ota ............................ 345/638 |
| 6,571,052 B1 | 5/2003 | Wakimoto et al. ............ 386/55 |
| 6,778,759 B1 * | 8/2004 | Yamada et al. ................ 386/95 |
| 2001/0022621 A1 | 9/2001 | Squibbs ................ 348/231.99 |

FOREIGN PATENT DOCUMENTS

| EP | 1 102 271 A1 | 5/2001 |
| EP | 1 187 472 A1 | 3/2002 |
| JP | 11-259502 | 9/1999 |
| JP | 2000-196933 | 7/2000 |
| JP | 2001-36840 | 2/2001 |
| WO | WO 98/54896 | 12/1998 |
| WO | WO 02/098130 A2 | 12/2002 |

* cited by examiner

*Primary Examiner*—Anh Hong Do
(74) *Attorney, Agent, or Firm*—Oblon, Spivak, McClelland, Maier & Neustadt, L.L.P.

(57) ABSTRACT

Time varying images 712 before coded are rearranged in a coding stage into unitary images 722 having the sequence of time stamps DTS 725. A GPS or the like provides position information indicative of the position whereat the respective unitary image of a motion image has been captured. The unitary image and the position information are correlated to one another by setting common time stamps PTS (724 and 723) thereon. When decoding each of blocks of coded and multiplexed data 731 to 735, the position information corresponding to the unitary image is specified. Thereby, the unitary image of the coded motion image and the corresponding position information are correlated to one another, whereby a trajectory of the motion image can be displayed on a map in accordance with the position information.

18 Claims, 16 Drawing Sheets

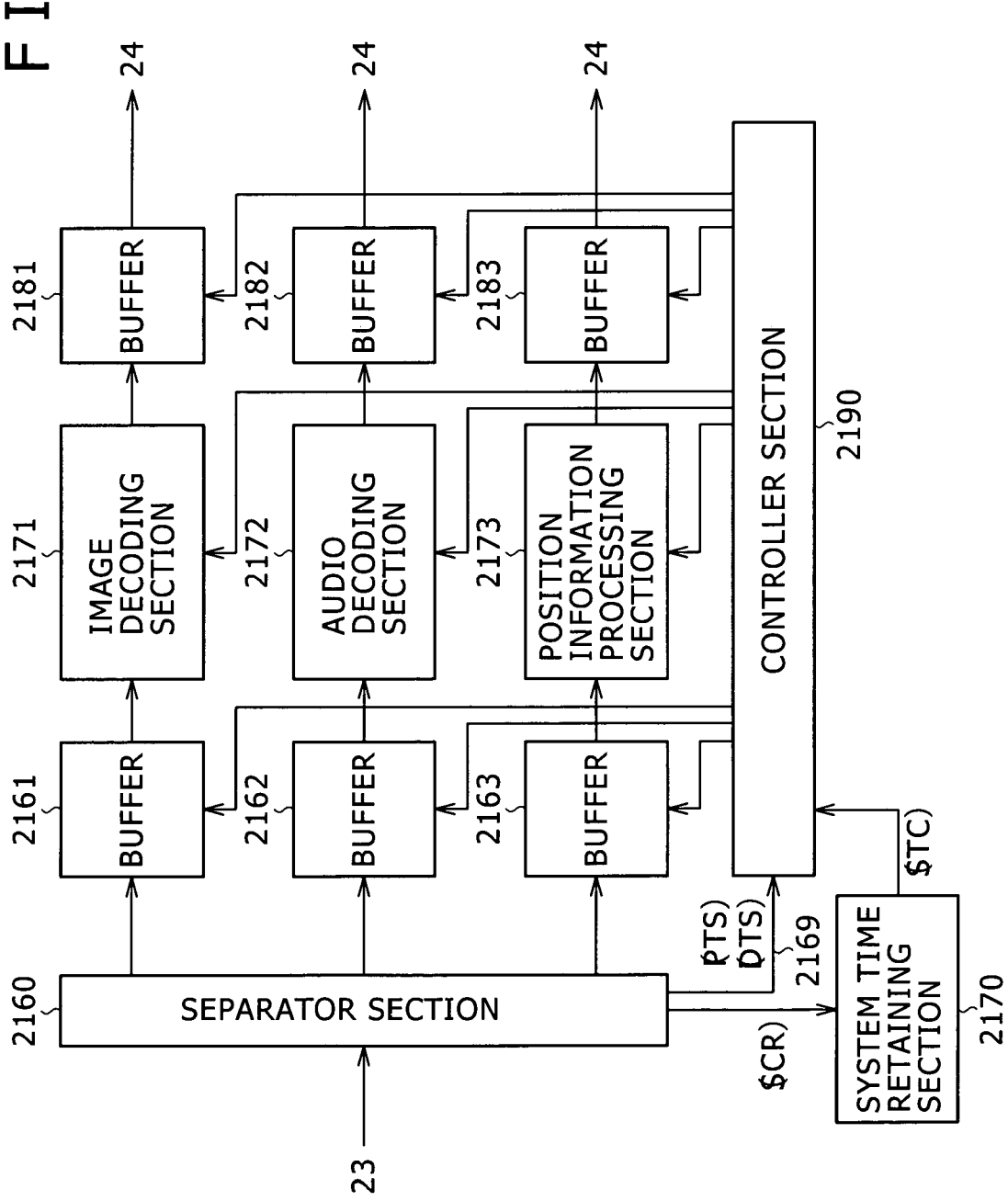

FIG. 6

| 891 CREATION DATE | 892 UPDATE DATE | 893 TITLE | 894 KEYWORD | 895 START ADDRESS |
|---|---|---|---|---|
| 2003/04/01 | 2003/04/05 | WEDDING | — | •→ |
| 2003/04/03 | 2003/04/03 | HIKE | LOOKOUT PLATFORM | •→ |
| 2003/04/04 | 2003/04/04 | BASEBALL WATCHING | BASEBALL, BALL | •→ |
| ⋮ | ⋮ | ⋮ | ⋮ | ⋮ |

RECORDING/REPRODUCING SYSTEM

TECHNICAL FIELD

The present invention relates to a recording and/or playback system. More particularly, the invention relates to a recording and/or playback system, an information generating apparatus, a recording apparatus, and playback apparatus that code and decode time series information (such as a motion image data), to a processing method therefor, and to a program for causing a computer to execute the methods.

BACKGROUND ART

Hitherto, there have been known apparatuses of the type having such a function that uses a GPS (global positioning system) to acquire a current position information and that provides a correlation between the position information and map information, thereby to display the current position on a map. In recent years, imaging apparatuses of the above-described type, such as digital cameras, having the GPS function have been proposed. In an imaging apparatus of that type, concurrently with capturing of an image, position information corresponding to an image capture position, and the image and the position information are correlated to one another and then recorded.

In addition, an imaging apparatus has been proposed wherein, in the imaging apparatus alone, when an icon is displayed on a map in accordance with position information, and the icon is selected, an image linked to the icon is displayed (see Japanese Unexamined Patent Application Publication No. 2001-189905 (FIG. 8), for example). This enables a user to easily to know a point at which a captured image was captured.

DISCLOSURE OF INVENTION

According to the previous technique described above, the still image and the position information are correlated to one another, and the icon is displayed on the map according to the position information, whereby the image linked to the icon is displayed. In comparison, in the case of time series information such as a motion image, the position information could vary depending on the content of the time series information, the position information has to be verified for respective time series information.

However, when performing operation such as recording time series information into recording medium or transmitting the information by using a transmission medium, a technique of coding the information into a predetermined format is used to enhance the recording efficiency or transmission efficiency. As such, an undesirable can take place where respective blocks of unitary information in the time series information (motion images, for example) are not necessarily arranged in the time series sequence.

For example, when coding a motion image by using the MPEG (Moving Picture Experts Group) scheme, predictive coding and data compression are performed. The predictive coding utilizes the interrelationship between blocks of information of an image frame or unitary images of motion images, and data compression utilizing the DCT (discrete cosine transform). In this case, the images of the respective frames are categorized into any one of three types of pictures: I picture (intra-coded picture), P picture (predictive-coded picture), and B picture (bidirectionally predictive-coded picture). The I picture represents a screen that can be obtained by intra-screen coding, and is coded in the same sequence as that of an original screen. The P picture represents a screen that can be obtained by inter-screen forward direction predictive coding, and similarly, is coded in the same sequence as that of the original screen. However, the B pictures represent a screen that can be obtained by bidirectional predictive coding, and are inserted between the I picture and the P picture after the I picture and the P pictures have been coded. As such, the B pictures are coded in a sequence different from that of the original screen. As such, the B pictures are positioned by permutation or rearrangement after the I picture or P picture that is referenced in the event of bidirectional predictive.

Accordingly, in the case that the respective blocks of unitary information, i.e. time series information, are rearranged, a problem occurs in that it makes it difficult to provide correlations between the respective blocks of unitary information and position information.

Accordingly, the present invention is to correlates respective unitary information of coded time series information and position information corresponding thereto and to a trajectory of the time series information on a map in accordance with the position information.

In order to achieve the above, an information generating apparatus according to claim 1 of the present invention includes image capturing means that captures a motion image to thereby generate motion image data; position information acquiring means that acquires position information indicative of a position where the motion image has been captured; motion image coding means that codes the motion image data; and multiplexing means that performs multiplexing by correlating the respective position information corresponding to at least one unitary image in the coded motion image data. This produces effects in that the respective unitary image of the coded motion image data and the corresponding position information are correlated to one another, thereby enabling it to display a trajectory of the motion image data on a map in the event of decoding.

According to claim 2 of the present invention, the information generating apparatus according to claim 1 further includes system time generating means that generates a system time, wherein the multiplexing means adds the system time common to the corresponding unitary image and position information thereto to thereby correlate the unitary image and the position information. This produces effects in that the correlation is performed in accordance with the system time, thereby enabling it to display the trajectory of the motion image data on the map in the event of decoding.

An information generating apparatus according to claim 3 includes image capturing means that captures a motion image, thereby to generate motion image data; position information acquiring means that acquires position information indicative of a position where the motion image has been captured; motion image coding means that codes the motion image data; system time generating means that generates a system time; multiplexing means that, for the motion image data coded by adding the system time common to at least one unitary image and the position information corresponding to the unitary image thereto, performs multiplexing by correlating the unitary image and the position information; and recording means that records the multiplexed data into recording medium. This produces effects in that the respective unitary image of the coded motion image data and the corresponding position information are correlated to one another, thereby enabling it to display a trajectory of the motion image data on a map in the event of decoding.

A playback apparatus according to claim 4 of the present invention includes image decoding means that, for data wherein coded motion image data and position information corresponding to at least one unitary image of the motion image data are correlated to one another, performs decoding of the motion image data; and displaying means that correlates the position information, which is correlated to the decoded motion image data, and a representative image of the motion image data, and performs display thereof on a map. This produces effects in that the coded motion image data is decoded, and a trajectory of the motion image data is displayed by being correlated to the representative image.

According to claim 5 of the present invention, the playback apparatus according to claim 4 further includes operation input means that receives an operation from the outside, wherein when a specification of the representative image is input by the operation input means, the displaying means displays the motion image data in from the unitary image. This produces effects in that the motion image data is displayed from the unitary image by specifying the representative image appearing on the map.

A playback apparatus according to claim 6 of the present invention includes image decoding means that, for data wherein coded motion image data and position information corresponding to at least one unitary image of the motion image data are correlated to one another, performs decoding of the motion image data; and superposing means that performs display by superposing a motion image played back in accordance with the decoded motion image data and a map indicating the position information corresponding to the motion image played back. This produces effects in that the motion image and the map indicating the position information corresponding to the motion image are verified at a glance.

According to claim 7 of the present invention, the playback apparatus according to claim 6 further includes communication means for acquiring the map. This produces effects in that a necessary map is acquired and displayed even when not all maps are possessed at all times.

According to claim 8 of the present invention, in the playback apparatus according to claim 6, the map contains famous-place information on a corresponding area. This produces effects in that scenic points are verified on the map, and famous-place information can easily be acquired.

A playback apparatus according to claim 9 of the present invention includes separating means that, for data wherein at least one unitary image in coded motion image data and position information corresponding to the unitary image are correlated by a common presented time and are thereby multiplexed, separates the motion image data and the position information from one another; image decoding means that decodes the separated motion image data; output means that outputs the separated position information and the unitary image of the decoded motion image data including the presented time common to the position information; and superposing means that performs display by superposing a map indicating the output position information and a motion image containing the output unitary image. This produces effects in that the motion image data separated from the multiplexed data is decoded, a playback screen of the motion image data and the map on which a trajectory of the motion image data are rendered are displayed.

A recording and/or playback system according to claim 10 of the present invention includes a recording apparatus for recoding data containing motion image data into a recording medium, and a playback apparatus for performing playback of the motion image data included in data recorded in the recording medium, the system being characterized, wherein the recording apparatus includes image capturing means that captures a motion image to thereby generate the motion image data, position information acquiring means that acquires position information indicative of a position where the motion image has been captured, motion image coding means that codes the motion image data, multiplexing means that performs multiplexing by correlating at least one unitary image and the position information corresponding to the unitary image in the coded motion image data, and recording means that records the multiplexed data into recording medium; and the playback apparatus includes separating means that separates data recorded in the recording medium into the coded motion image data and the position information, image decoding means that decodes the coded motion image data, output means that outputs the separated position information and a unitary image of motion image data correlated to the position information, and superposing means that performs display by superposing a map indicating the output position information and a motion image containing the output unitary image. This produces effects in that, in the recording apparatus, the respective unitary image of the motion image data and the position information corresponding to the unitary image are correlated to one another and are recorded into the recording medium; and in the playback apparatus, the map indicating the position information and the motion image are superposed on one another and displayed.

A method according to claim 11 of the present invention includes a step of capturing a motion image to thereby generate motion image data; a step of acquiring position information indicative of a position where the motion image has been captured; a step of coding the motion image data; a step of multiplexing by correlating the respective position information corresponding to at least one unitary image in the coded motion image data; and a step of outputting the multiplexed data. This produces effects in that the respective unitary image of the coded motion image data and the corresponding position information are correlated to one another, thereby enabling it to display a trajectory of the motion image data on a map in the event of decoding.

A method according to claim 12 of the present invention includes a step of capturing a motion image to thereby generate motion image data; a step of acquiring position information indicative of a position where the motion image has been captured; a step of coding the motion image data; a step of multiplexing by correlating the respective position information corresponding to at least one unitary image in the coded motion image data; and a step of recording the multiplexed data into a recording medium. This produces effects in that the respective unitary image of the coded motion image data and the corresponding position information are correlated to one another, thereby enabling it to display a trajectory of the motion image data on a map in the event of playback.

A method according to claim 13 of the present invention includes a step of, for data wherein coded motion image data and position information corresponding to at least one unitary image of the motion image data are correlated to one another, performing decoding of the motion image data; a step of rendering the position information on a map; and a step of displaying a motion image containing a unitary image correlated to the position information, together with the map. This produces effects in that the motion image and the map indicating the position information corresponding to the motion image are verified at a glance.

A method according to claim 14 of the present invention includes a step of, for data wherein coded motion image data and position information corresponding to at least one unitary image of the motion image data are correlated to one another, performing decoding of the motion image data; a step of, when a map corresponding to the position information is not possessed, acquiring the map a step of rendering the position information on the map; and a step of displaying a motion image containing a unitary image correlated to the position information, together with the map. This produces effects in that a necessary map is acquired and displayed even when not all necessary maps are possessed at all times.

A program according to claim 15 of the present invention causes a computer to execute a step of capturing a motion image to thereby generate motion image data; a step of acquiring position information indicative of a position where the motion image has been captured; a step of coding the motion image data; and a step of multiplexing by correlating the respective position information corresponding to at least one unitary image in the coded motion image data. This produces effects in that the respective unitary image of the coded motion image data and the corresponding position information are correlated to one another, thereby enabling it to display a trajectory of the motion image data on a map in the event of decoding.

A program according to claim 16 of the present invention causes a computer to execute a step of, for data wherein coded motion image data and position information corresponding to at least one unitary image of the motion image data are correlated to one another, performing decoding of the motion image data; a step of rendering the position information on a map; and a step of displaying a motion image containing a unitary image correlated to the position information, together with the map. This produces effects in that the motion image and the map indicating the position information corresponding to the motion image are verified at a glance.

A program according to claim 17 of the present invention causes a computer to execute a step of, for data wherein coded motion image data and position information corresponding to at least one unitary image of the motion image data are correlated to one another, performing decoding of the motion image data; a step of, when a map corresponding to the position information is not possessed, acquiring the map; a step of rendering the position information on the map; and a step of displaying a motion image containing a unitary image correlated to the position information, together with the map. This produces effects in that a necessary map is acquired and displayed even when not all necessary maps are possessed at all times.

BRIEF DESCRIPTION OF THE DRAWINGS

FIG. 4 is a view showing an example configuration of a decoding function of the coding/decoding circuit 21 according to the embodiment of the present invention.

FIG. 6 is a view showing an example file management table according to the embodiment of the present invention.

BEST MODE FOR CARRYING OUT THE INVENTION

An embodiment of the present invention will be described in detail herebelow with reference to the drawings.

Figure 1:
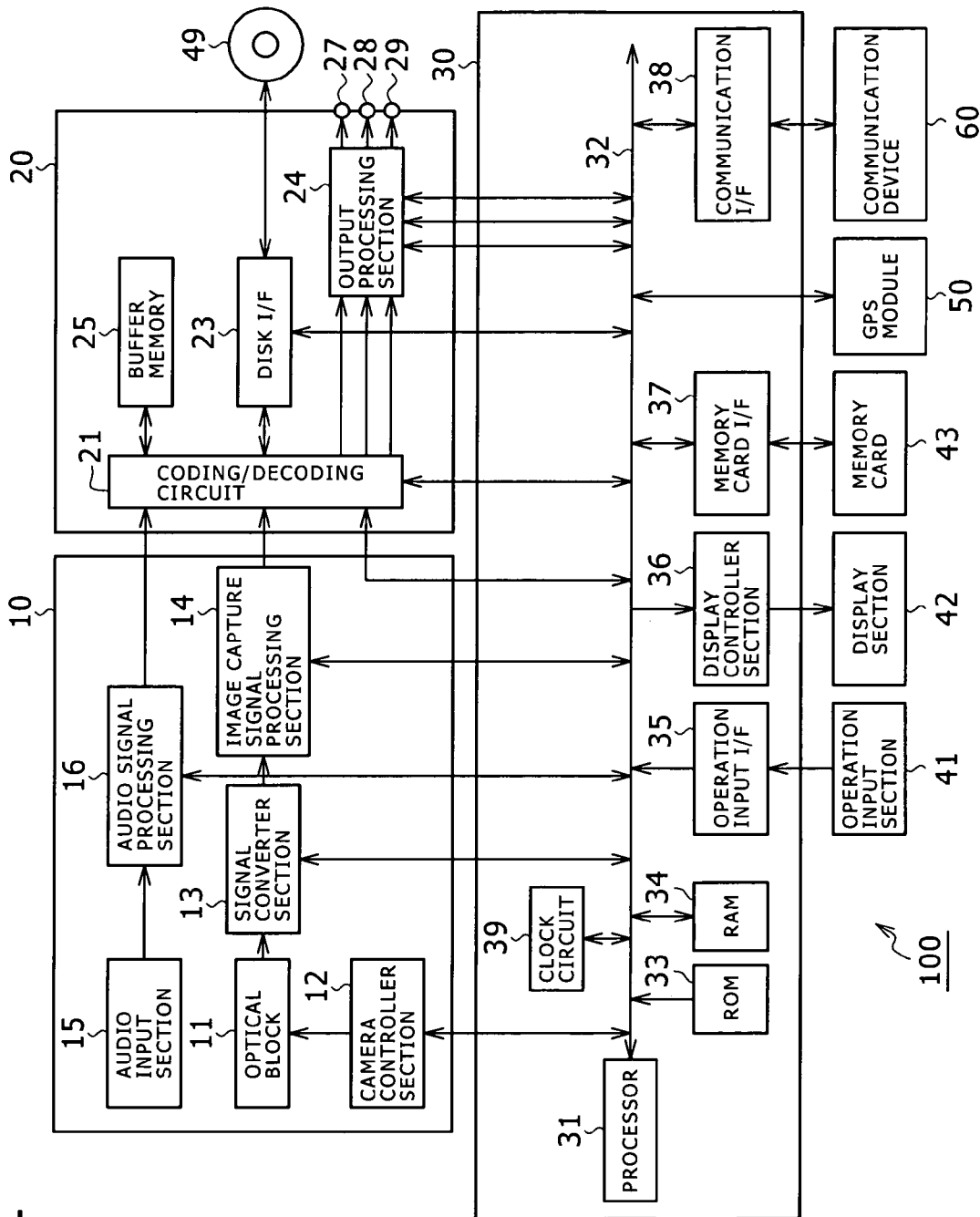
FIG. 1 is a view showing an example configuration of a mobile device 100 according to an embodiment of the present invention.

FIG. 1 is a view showing an example configuration of a mobile device 100 according to an embodiment of the present invention. The mobile device 100 has a camera section 10, a recording and/or playback processing section 20, and a controller section 30. A GPS module 50 and a communication device 60 are connected to the mobile device 100. The GPS module 50 receives radio waves from a plurality of GPS satellites, thereby to calculate the latitude and longitude of the current position. The communication device 60 communicates with an other mobile device, thereby to perform transmission and reception of data that includes motion image data. The GPS module 50 and the communication device 60 each include, for example, a radio frequency (or, "RF") section, an intermediate frequency (or, "IF") section, and an analog-digital (or, "AD") converter section, but may be configured to share portions or all of the respective sections.

The camera section 10 has an optical block 11, a camera controller section 12, a signal converter section 13, an image capture signal processing section 14, an audio input section 15, and an audio signal processing section 16. The optical block 11 contains, for example, a lens group for capturing image object, a diaphragm control mechanism, a focus control mechanism, a zoom mechanism, a shutter mechanism, a flash mechanism, and a motion blur correction mechanism. The camera controller section 12 receives control signals from the controller section 30, thereby to generate control signals and to supply the signals to the optical block 11. With the generated control signals having been supplied to the optical block 11, the section performs operations of control, such as direction zoom control, shutter control, and exposure control.

The signal converter section 13 is configured of, for example, an image capture devices such as a CCD (charge coupled device), wherein an image passed through the optical block 11 is formed on an image plane thereof. The signal converter section 13 receives an image retrieval timing signal supplied from the controller section 30 in response to a shutter operation, then converts the image-object image formed on the image plane into an image capture signal, and then supplies the signal to an image capture signal processing section 14.

In accordance with control signals received from the controller section 30, the image capture signal processing section 14 performs processes, such as gamma correction and AGC (auto gain control), with respect to the image capture signal. In addition, the controller section 15 performs the process of conversion of the image capture signal into an image signal into a digital signal. The audio input section 15 collects audio in peripheral portions of an image object during image capture. Audio signals from the audio input section 15 are supplied to the audio signal processing section 16. The audio signal processing section 16 performs processes, such as correction and AGC of the audio signals, and in addition, the process of converting the audio signal into a digital signal in accordance with the control signal received from the controller section 30.

The recording and/or playback processing section 20 has a coding/decoding circuit 21, a disk interface 23, an output processing section 24, and a buffer memory 25. In the present embodiment, although it is contemplated that a disk 49 is a recording medium being used as an object of recording and/or playback, however, it is one example. For example, a memory card 43 may be used, as described further below.

The coding/decoding circuit 21 has a coding function that codes inputs, such as an image signal and audio signal received from the camera section 10 and position information received from the GPS module 50, and multiplexes the inputs, and converts them into compressed data. Further, the coding/decoding circuit 21 has a decoding function that separates an image signal, audio signal, and position information from the compressed data, and then decodes them. As a format of the respective compressed data, the MPEG-2 PS (program stream) format can be used, for example.

Further, in accordance with a control signal from the controller section 30, the coding/decoding circuit 21 performs processes such as automatic white balance control, exposure correction control, and zoom magnification control corresponding to a digital zoom scale factor for an image signal received from the image capture signal processing section 14.

The disk interface 23 receives compressed data from the coding/decoding circuit 21 and then writes the data into the disk 49. In addition, the disk interface 23 reads compressed data from the disk 49 and then supplies the data to the coding/decoding circuit 21. In accordance with a control signal received from the controller section 30, the output processing section 24 supplies the compressed data received from the coding/decoding circuit 21 to the controller section 30 and output terminals 27 to 29, for example. The buffer memory 25 is configured of, for example, a SDRAM, and is used as a work area for coding or decoding that is performed in the coding/decoding circuit 21.

The controller section 30 is configured of a processor 31, a ROM 33 (read only memory), a RAM 34 (random access memory), the operation input interface 35 for connecting an operation input section 41, a display controller section 36 for connecting the display section 42, a memory card interface 37 for installing the memory card 43, a communication interface 38 for connecting the communication device 60, and a clock circuit 39 that are connected via a system bus 32.

The processor 31 manages the overall processing of the controller section 30, and uses the RAM 34 as a work area. The ROM 33 is written with, for example, a program for controlling the camera section 10, and a program for executing, for example, recording control and playback control of image signals and audio signals.

The operation input section 41 connected to an operation input interface 35 has plural keys in a display section 42. The keys include, for example, a mode switch mode key for switching between a photograph mode and an other mode such as a playback mode, a zoom control key, an exposure control key, a shutter key, motion image photographing key, and display control keys in a display section 42. The operation input interface 35 transfers an operation signal from the operation input section 41 to the processor 31. The processor 31 determines which key has been operated in the operation input section 41, and performs the control process in accordance with the result of the determination.

The display section 42 connected to the display controller section 36 is configured of, for example, an LCD (liquid crystal display), and displays, for example, an image signal received from the camera section 10, an image signal read from the disk 49, or an image signal received by the communication device 60 under the control of the processor 31. In addition, as described further below, the display section 42 displays a map in accordance with a position information correlated to an image signal. As the position information, the latitude and longitude at which the correlated image signal has been acquired is indicated. Accordingly, indications can be displayed in accordance the latitude and longitude in the position information.

The memory card interface 37 writes compressed data from the coding/decoding circuit 21 into the memory card 43. In addition, the memory card interface 37 reads compressed data from the memory card 43, and supplies the compressed data to the coding/decoding circuit 21.

The clock circuit 39 generates time information representing, for example, the second, minute, hour, date, month, and year. The clock circuit 39 is configured to generate the information with an accuracy of an after-decimal-point level as the second such as to enable it to count the frame units of the image.

Figure 2:
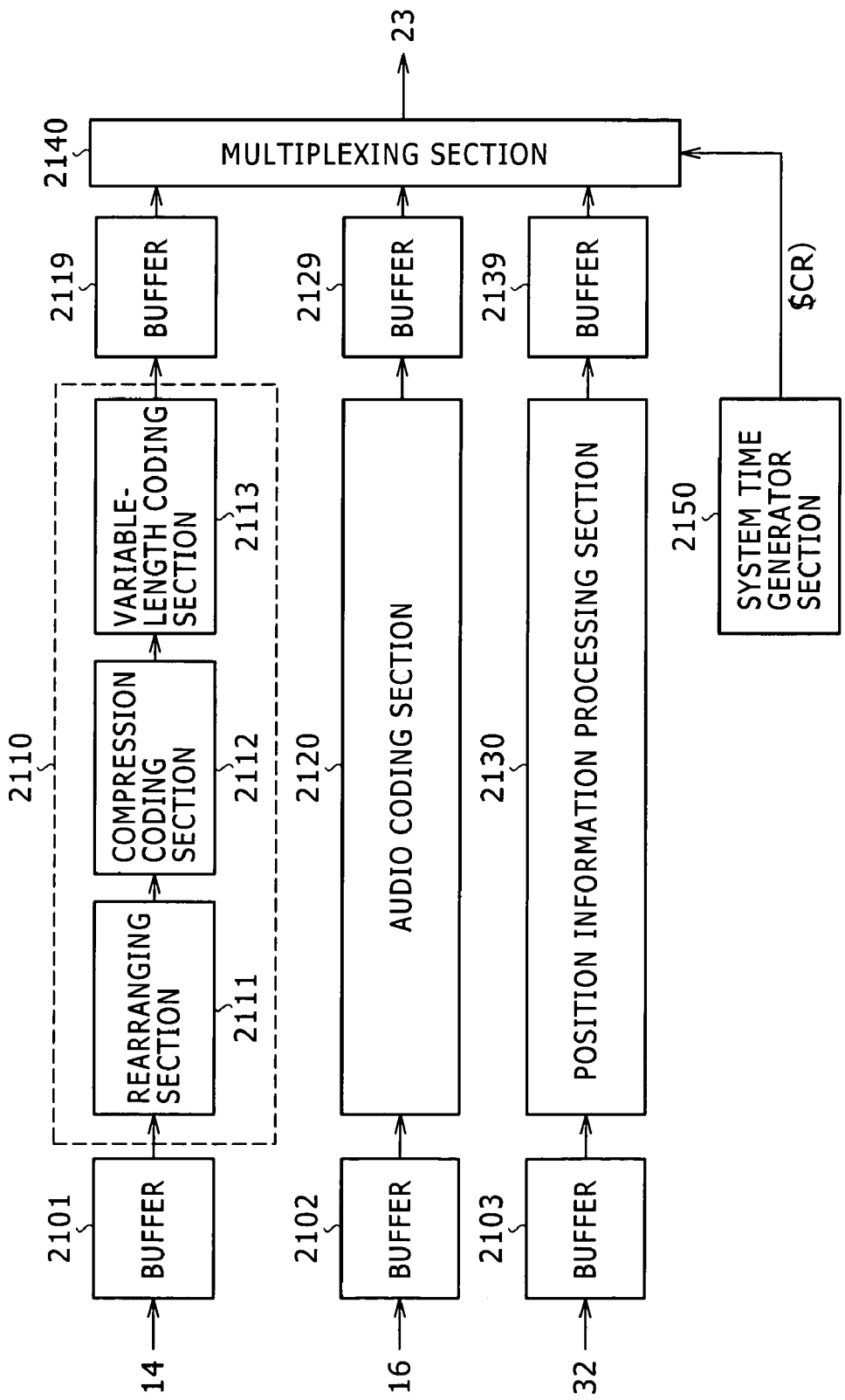
FIG. 2 is a view showing an example configuration of a coding function of a coding/decoding circuit 21 according to the embodiment of the present invention.

FIG. 2 is a view showing an example configuration of the coding function of the coding/decoding circuit 21 according to the embodiment of the present invention. The coding function has buffers 2101 to 2103, an image coding section 2110, an audio coding section 2120, a position information processing section 2130, buffers 2119, 2129, and 2139, a multiplexing section 2140, and a system time generator section 2150.

The buffers 2101 to 2103 each function as an input buffer of the coding/decoding circuit 21. The buffer 2101 stores an image signal received from the image capture signal processing section 14. The buffer 2102 stores an audio signal received from the audio signal processing section 16. The buffer 2103 stores position information received from the GPS module 50. In addition, the buffer 2101 supplies the image signal to the image coding section 2110. The buffer 2102 supplies the audio signal to the audio coding section 2120. The buffer 2103 supplies the position information to the position information processing section 2130.

The image coding section 2110 has a rearranging section 2111, a compression coding section 2112, and a variable-length coding section 2113. The image coding section 2110 provides the configuration of a GOP (group of pictures) formed of at least one I picture, plural P pictures, and plural B pictures as unitary images of motion image data, and performs the compression process in units of the GOP as one segment.

The rearranging section 2111 performs rearrangement so that the B picture is positioned after the I picture or the P picture that are referenced in the event of bidirectional predictive coding of the B picture, as described above.

For the I picture, the compression coding section 2112 performs an intra-frame coding process to perform data compression. For the P picture, the compression coding section 2112 performs the intra-frame coding process using the interrelationship with the forward I picture or rearward P picture, thereby to perform data compression. For the B picture, the compression coding section 2112 performs intra-frame coding process using the interrelationship with the forward and backward I pictures or P pictures, thereby to perform data compression. In the P picture, there also is an image portion on which intra-frame coding process is performed.

The variable-length coding section 2113 carries out a variable-length coding process using, for example, Huffman codes. The result of the variable-length coding process is supplied to the buffer 2119.

The audio coding section 2120 performs compression coding in units of a predetermined amount of an audio signal, which is called a frame. The audio signal thus compression coded is supplied to the buffer 2129.

The position information processing section 2130 outputs position information with timing corresponding to the respective frame of the image signal. The position information is supplied to the buffer 2139.

The multiplexing section 2140 packetizes the respective image signal, audio signal, and position information, to multiplex them. In this event, a pack header is set for plural packets thereby to configure the pack. Multiplexed data (i.e., data in the MPEG-2 PS format) generated by the multiplexing section 2140 is written by the disk interface 23 on the disk 49.

The system time generator section 2150 generates a system time reference value (system clock reference (SCR)), and supplies the value to the multiplexing section 2140. The system time reference value is recorded as one item of the pack header added by the multiplexing section 2140. In specific, the system time reference value is included into the respective pack of the multiplexed data. Then the system time reference value is used to synchronize the system time in the event of decoding.

In addition, the system time reference value provides a time reference that is used in the event of setting the time stamps called PTS (presentation time stamp) and DTS (decoding time stamp). The time stamp PTS is time management information for a playback output, and is indicative of when to produce a playback output of a unitary image set with the time stamp. The time stamp DTS is time management information for decoding, and is indicative of when to decode a unitary image set with the time stamp.

The time stamps PTS and DTS are each recorded as one item of the packet header of the respective packet in the respective pack. As described above, since the I picture and the P picture have to be sent earlier than the B picture to the coding stream, the sequence of decoding and the sequence of producing the playback output are different from one another. For this reason, the time stamp PTS and the time stamp DTS are provided independent of one another for discrimination. As such, when the time stamp PTS and time stamp DTS match with one another, the time stamp DTS is not set, so that the time stamp PTS is recorded in the packet header.

In addition, when one unitary image is segmented into plural packets because of the packet size limitation, the time stamp is recorded only in the packet header of the first packet, the time stamp is not recorded in the packet headers of respective one of the packets subsequently divided.

The time stamp DTS is set for a packet of an image signal for which sequential rearrangement occurs. As such, in the case of, for example, an audio signal or position information for which sequential rearrangement is not carried out, the time stamp DTS is not used, but only the time stamp PTS is set.

Figure 3A:
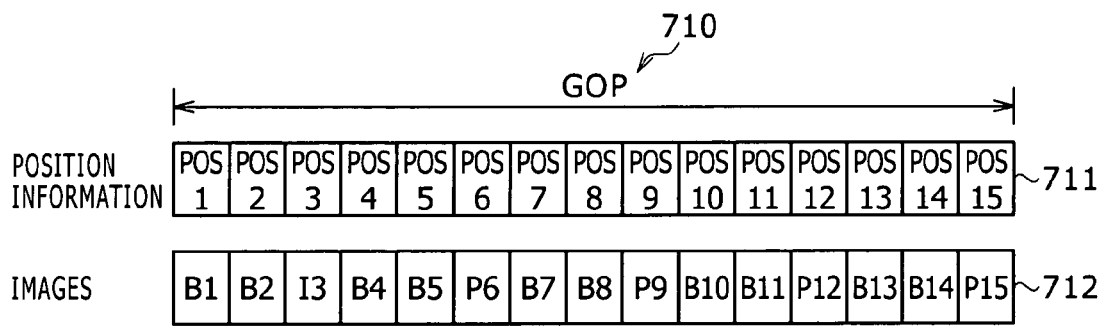
FIGS. 3A-3C are views showing an example data structure according to the embodiment of the present invention.

FIG. 3 is a view showing an example data structure according to the embodiment of the present invention. FIG. 3(a) is a view showing the relationships between unitary images of an original image and blocks of position information. In the example, for motion images 712, a GOP 710 is configured of 15 frames of unitary images (B1 to P15), and blocks of position information 711 (POS1 to POS15) are acquired corresponding to the respective unitary images.

In the unitary images 712, 13 represents an I picture; B1, B2, B4, B5, B7, B8, B10, B11, B13, and B14 respectively represent B pictures; and P6, P9, P12, P15 respectively represent P pictures. The respective suffix numbers are serial numbers set, regardless of the picture types. In the blocks of position information 711, POS1 to POS15, respectively, represent blocks of position information corresponding to image frames (unitary images) identified by the suffix numbers. That is, the blocks of position information POS1 to POS15 are, respectively, the blocks of position information corresponding to the image frames shown by the same suffix numbers.

Figure 3B:
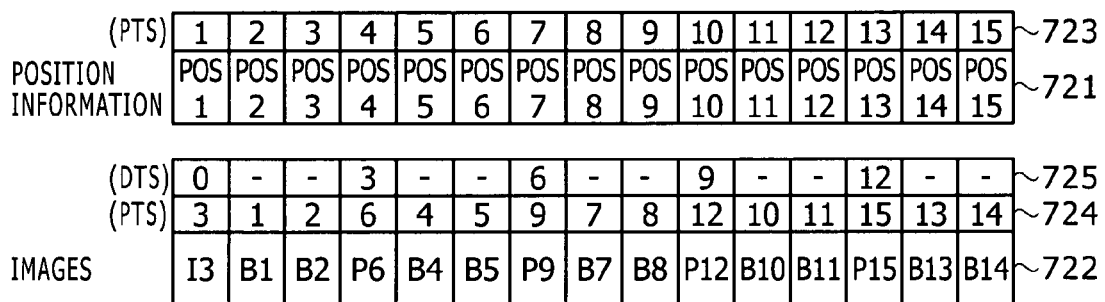

The unitary images 712 of the original image of FIG. 3(a) are rearranged by the rearranging section 2111 of the image coding section 2110 into a picture sequence as shown in unitary images 722 of FIG. 3(b). In comparison thereto, the sequence of the blocks of position information is not changed, the blocks of position information 721 shown in FIG. 3(b) have the same sequence as the blocks of position information 711 of FIG. 3(a). As such, only with the sequence, the correlation between the respective picture and the respective position information cannot be known.

For the above reason, in the multiplexing section 2140, the time stamp PTS, which is time management information of a playback output, is added to the respective unitary image and the respective position information. In FIG. 3(b), PTS 723 represents a time stamp PTS of the respective position information 721, and PTS 724 represents a time stamp PTS of the respective unitary image 722. Playback outputs have the original frame sequence, and the respective the suffix number is substantially identical to the time stamp PTS 724. The time stamps PTS 723 and PTS 724 are associated with one another, the position information and the respective unitary image are correlated to one another, whereby the association can be made so as to be able to identify that position information corresponds to which one of the unitary images.

In addition, a time stamp DTS 725 is set for the respective unitary image 722. As described above, the time stamps DTS are blocks of time management information for decoding, in compressed data (i.e., in the MPEG-2 PS format), the unitary images are arranged in the sequence of the time stamps DTS. The time stamp DTS 725 is not set when matching the time stamp PTS 724. Accordingly, in the example shown in FIG. 3(b), the time stamp DTS 725 is set for the I picture and the P picture, but is not set for the B picture.

Figure 3C:
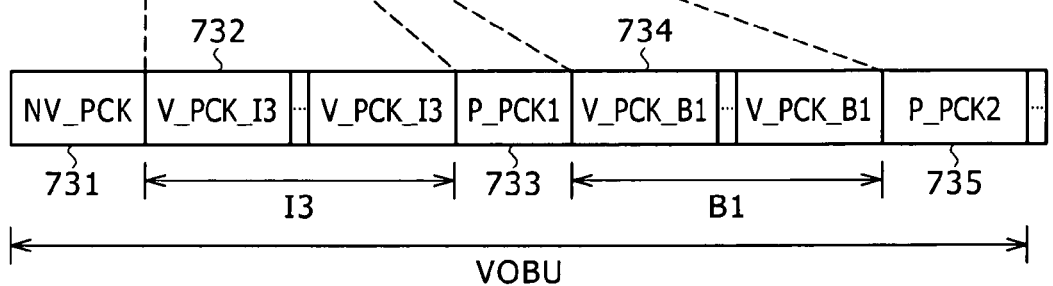

FIG. 3(c) is a view showing a data structure after the respective data shown in FIG. 3(b) have been multiplexed. A navigation pack 731(NV_PCK) is positioned at the top of a pack group corresponding to a respective GOP, and retains playback management information, such as data search information (such as control information that specifies a sector to which processing jumps in the event of jumping). In the DVD format described further below, a pack group corresponding to one GOP is called a "video object unit (VOBU)".

A pack group 732(V_PCK_I3) retains image data corresponding to the unitary image I3. The pack size in the DVD format is 2048 bytes per pack, such that when the size of image data exceeds that pack size, the data is divided to be retained in plural packs. A pack 733(P_PCK1) retains position information corresponding to the position information POS1. A pack group 734 (V_PCK_B1) retains image data corresponding to a unitary image B1. A pack 735(P_PCK2) retains position information corresponding to the position information POS2.

Thus, the unitary images are multiplexed with the position information in the sequence rearranged in the event of coding. In the example shown in FIG. 3(c), multiplexing is performed in the manner that the pack 733 is arranged between the pack group 732 and the pack group 734. However, the multiplexing may be performed in any other manner inasmuch as interchange does not take place between unitary images or between blocks of position information. Accordingly, for example, the pack 733 may be arranged either before the pack group 732 or after the pack group 734. In addition, blocks of position information 721 may be collectively arranged.

In addition, in the example of FIG. 3, although all the unitary images retain the corresponding position information, the correspondence between the unitary images and the position information may not necessarily be one to one. For example, blocks of corresponding position information may be retained every N unitary images (N: natural number), or alternatively, the blocks of position information may be retained in units of one GOP.

Although audio signals are not shown in FIG. 3, the audio signal can be additionally multiplexed in the same manner as in the previous cases.

FIG. 4 is a view showing an example configuration of a decoding function of the coding/decoding circuit. The decoding function has a separator section 2160, a system time retaining section 2170, a buffer 2161, a buffer 2163, an image decoding section 2171, an audio decoding section 2172, a position information processing section 2173, buffers 2181 to 2183, and a control section 2190.

The separator section 2160 separates an image signal, audio signal, and position information from the multiplexed data (i.e. data in the MPEG-2 PS format). The image signal, audio signal, and position information are retained in the buffers 2161 to 2163, respectively. In addition, the separator section 2160 separates a pack header and packet headers from a respective pack, and supplies header information thereof to the system retaining section 2170 and the control section 2190.

The system retaining section 2170 retains the system time (system time clock (STC)) that is used for the decoding function. The system retaining section 2170 determines a system time (STC) retained in itself in accordance with the system clock reference (SCR) value contained in the pack header supplied from the separator section 2160. The system time (STC) is supplied to the control section 2190.

Under the control of the control section 2190, the image decoding section 2171 decodes the image signal, which is retained in the buffer 2161, in the sequence following the time stamp DTS to thereby be restored to the image data in the frame unit, and then outputs the data to the buffer 2181. Under the control of the control section 2190, the audio decoding section 2172 decodes the audio signal, which is retained in the buffer 2162, to thereby be restored to the audio data, and then outputs the data to the buffer 2182. Under the control of the control section 2190, the position information processing section 2173 reproduces the position information corresponding to the image data (unitary image) in the frame unit, and then outputs the information to the buffer 2183.

The control section 2190 analyzes the header information supplied from the separator section 2160, extracts the time stamps PTS and DTS, and controls the decoding processes and playback outputs of image signal, audio signal, and position information. In the image decoding section 2171, the unitary image is decoded in the sequence following the time stamp DTS and is retained in the buffer 2181. However, in accordance with control of the control section 2190, data of the unitary image is output from the buffer 2181 in the sequence following the time stamp PTS. The control section 2190 performs control such that also the outputs from the buffer 2182 and 2183 are supplied in the sequence following the time stamp PTS.

In addition, the control section 2190 performs control so that the time stamps PTS of the image signal, audio signal, and position information output from the buffers 2181 to 2183 to the output processing sections 24 are synchronized in timing with one another. More specifically, the image signal, audio signal, and position information, respectively, are output from the buffer 2181 to 2183 to the output processing sections 24 with timings wherein the system time (STC) supplied from the system retaining section 2170 matches with the time stamps PTS of the respective packet headers. Thereby, the unitary image and position information of image signals different in sequence in the compressed data are correlated to one another and displayed.

Figure 5:
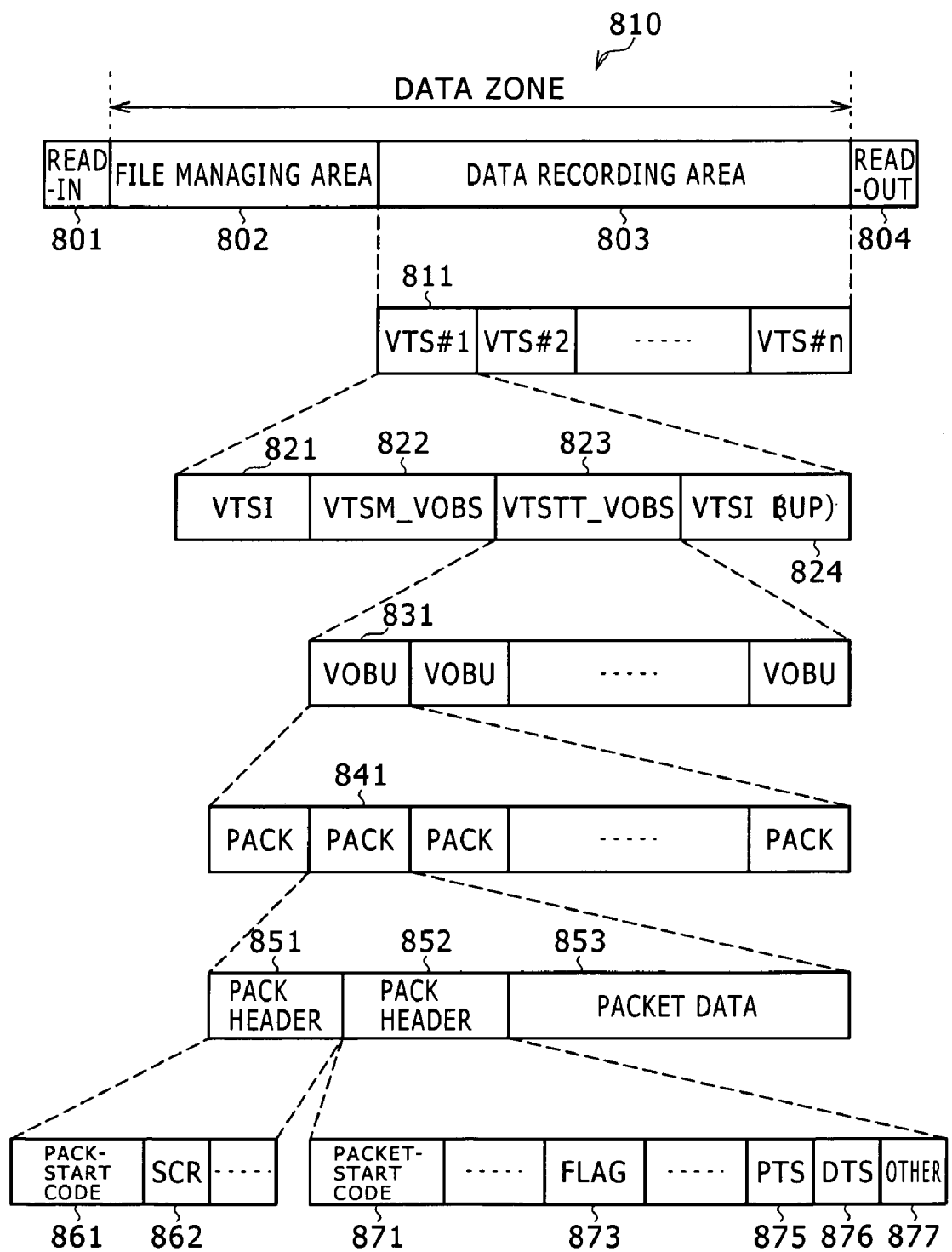
FIG. 5 is a view showing a data structure of a DVD-video format as an example format to be used for a disk 49 according to the embodiment of the present invention.

FIG. 5 is a view showing a data structure of a DVD-video format as an example format to be used for the disk 49 according to the embodiment of the present invention. As viewed in the disk's radial direction, a recording area of the disk 49 is segmented into a read-in area 801, a file managing area 802, a data recoding area 803, and a read-out area 804 in that order.

From the side of a read-in area, the file managing area 802 includes a UDF (universal disc format) area and a VMG (video manager) area. The UDF area and the VMG area are each a recording area for management information for being used to manage a file of, for example, image data recorded in the DVD. The UDF area supports the UDF standards and the ISO 9660 standards, thereby to enable the computer to read the DVD. The VMG area is a recording area for DVD management information.

The data recording area 803 is a recording area for, for example, image signals and audio signals, wherein the data are recorded in units of a data group defined as a video title set (VTS) 811. The respective video title set 820 is configured of video title set information (VTSI) 821, a video title set menu (VTSM_VOBS: video object set for the VTSM) 822, a video title set title (VTSTT_VOBS: video object for titles in a VTS) 823, and a back-up (VTSI(BUP): back-up of VTSI) 824.

The video title set information (VTSI) 821 is control information corresponding to a video title set. The video title set menu (VTSM_VOBS) 822 has contents for various menus in the video title set. The video title set title (VTSTT_VOBS) 823 has contents for reproducing the titles. The back-up (VTSI(BUP)) 824 is a back-up copy of the video title set information 821.

In the video title set title (VTSTT_VOBS) 823, compressed data in the MPEG-2 PS format is recorded on the basis of the video object unit (VOBU) as a read/write unit. The VOBU includes, for example, an image signal corresponding to one GOP, and an audio signal corresponding thereto. Thus, the DVD is accessed in units of one GOP.

The video object unit (VOBU) is configured of plural packs 841. The pack 841 is, generally, configured of one or plural packets. However, in the present example, it is assumed that one pack contains one packet. More specifically, one pack has a pack header 851 added before the packet, and the packet has a pack header 852 and a pack data 853 (data body). In the DVD-video format, it is specified that the size of one pack is 2048 bytes (corresponding to one sector).

The pack header 851 contains a pack-start code 861, which represents the start of the pack, and a system clock reference value (SCR) 862. The system clock reference value (SCR) 862 is based on the system time generator section 2150, as described above. According to MPEG-2 PS, the clock is indicated by 27 MHz, such that the system clock reference value (SCR) 862 is represented by 42 bits in the pack header 851.

The pack header 852 is configured along a private 1 packet, and has a packet-start code packet 871, a flag 873, a PTS 875, a DTS 876, and an other field 877. The packet-start code packet 871 represents the start of the packet, and includes a stream identifier that identifies the stream. The flag 873 represents the presence of the subsequent PTS 875 and DTS 876. In more specific, "10" represents the presence of only the PTS 875, and "11" represents the presence of the PTS 875 and the DTS 876.

As described above, PTS 875 and the DTS 876, respectively, are the time stamps representing the timing of playback output and the timing of decoding. The control section 2190 looks up the PTS 875 and the DTS 876, thereby to control decoding and playback output. In the pack header 852, the PTS 875 and the DTS 876 are each represented by 33 bits.

In the present case, while description has been made with reference to the example to which the private 1-packet is adapted, a private 2-packet may be adapted. For example, the plural blocks of position information may each be paired with the respective the time stamps PTS to be stored in one pack. In addition, although the examples where the DVD-video format is adapted have been described, other formats may be adapted. For example, the position information may be retained in an RDI packet of RDI-data area of a pack RDI_PCK located atop a VOBU in the DVD-VR format.

FIG. 6 is a view showing an example file management table according to the embodiment of the present invention. The file management table may be retained in the file managing area 802 in DVD-video format. Alternatively, the table may be retained in a predetermined position of the data recording area 803, or may be retained by using a predetermined file name. The file management table contains attribute data regarding respective files recorded in the disk 49, including a creation date 891, an update date 892, a title 893, a keyword 894, and a start address 895.

The creation date 891 indicates the date of creation of a corresponding file. The update date 892 indicates the date of update of a corresponding file. The title 893 is set by a user to identify the content of a corresponding file. The keyword 894 is arbitrarily set by the user to be used for retrieving a corresponding file. Theses contents can be used as identification conditions for retrieving a corresponding file.

The start address 895 indicates a start address of a corresponding file, and specifically, a sector or address in the disk 49. Thereby, the file management table is correlated to respective files.

With the file management table thus provided, the content of a file recorded on the disk 49 can be efficiently retrieved, the amount of time necessary for seek on the disk 49 can be reduced. When the file management table is not used, files on the disk 49 have to be serially retrieved. However, collectively managing such files with the file management table enables it to reduce the time necessary for retrieval.

Figure 7:
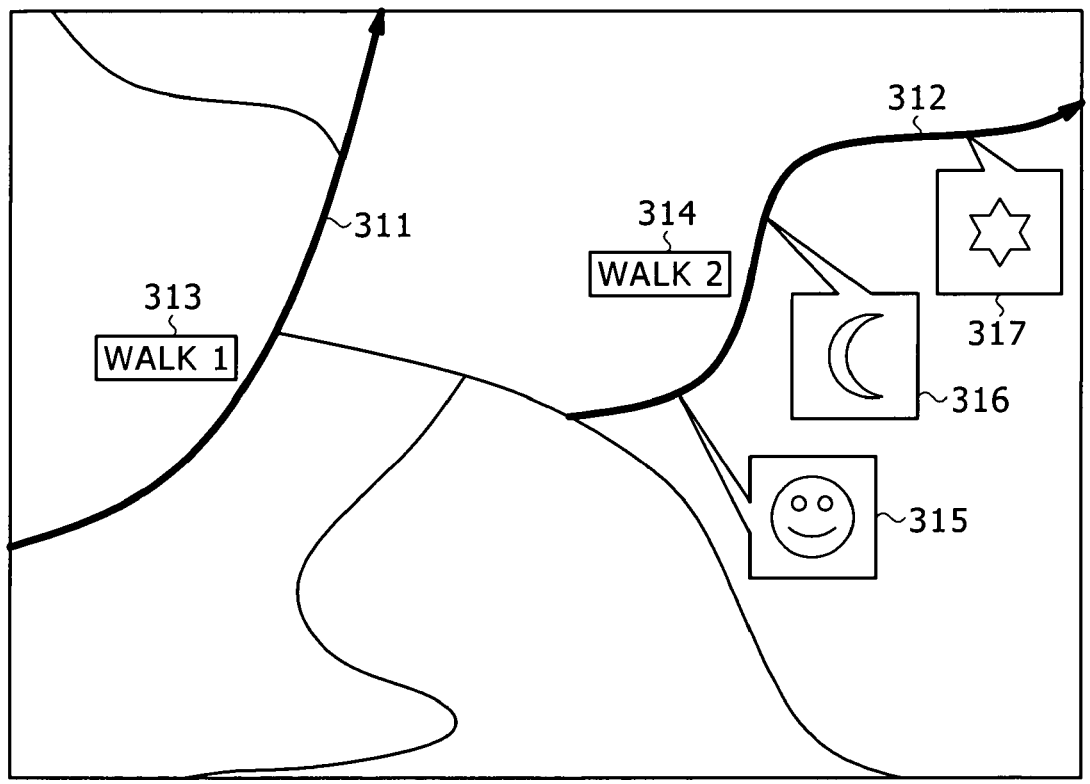
FIG. 7 is a view showing an example screen display according to the embodiment of the present invention.

FIG. 7 is a view showing an example screen display according to the embodiment of the present invention. The example screen display is a display of a content of the disk 49 on a map. In the example, it is assumed that two files are included in the disk 49, and histories of positions in the event of photographing thereof appear as blocks of position information 311 and 312 on the map on the display section 42. Titles 313 and 314 show the titles of the respective files represented by the blocks of position information 311 and 312.

On the example display, when a designation or specification, such as a click with a mouse, is provided through the operation input section 41 on any portion of the position information 311, playback of the file corresponding to the position information 311 is performed. For example, when the start position (tail end of the arrow) of the position information 311 is clicked, playback is performed from the beginning of the file corresponding to the position information 311. In addition, when a midway portion of the position information 311 is clicked, playback of the motion image signal is performed from the position of a scene corresponding to the clicked position.

In addition, icons 315 to 317 are displayed between a start position and an end position of the image of the position information 312. The icons 315 to 317 each indicate a representative image at a corresponding position, and for example, an I picture in a corresponding GOP can be used as the representative image. When any one of the icons 315 to 317 is specified, playback of the image signal is performed from the position of a scene (unitary image) corresponding to the icon.

For displaying the icons, various methods are contemplated, such as a method wherein the icons are displayed at a predetermined pitch(es), a method wherein the number of the icons are specified to display the icons at the same pitch, and a method wherein the icons are displayed at arbitrarily specified positions.

Thus, by displaying the position information on the map, the motion image recorded in the recording medium can be managed by means of the map, which is user-friendly, such that product usability can be improved. Thereby, indexing of a motion image can become easy.

Figure 8:
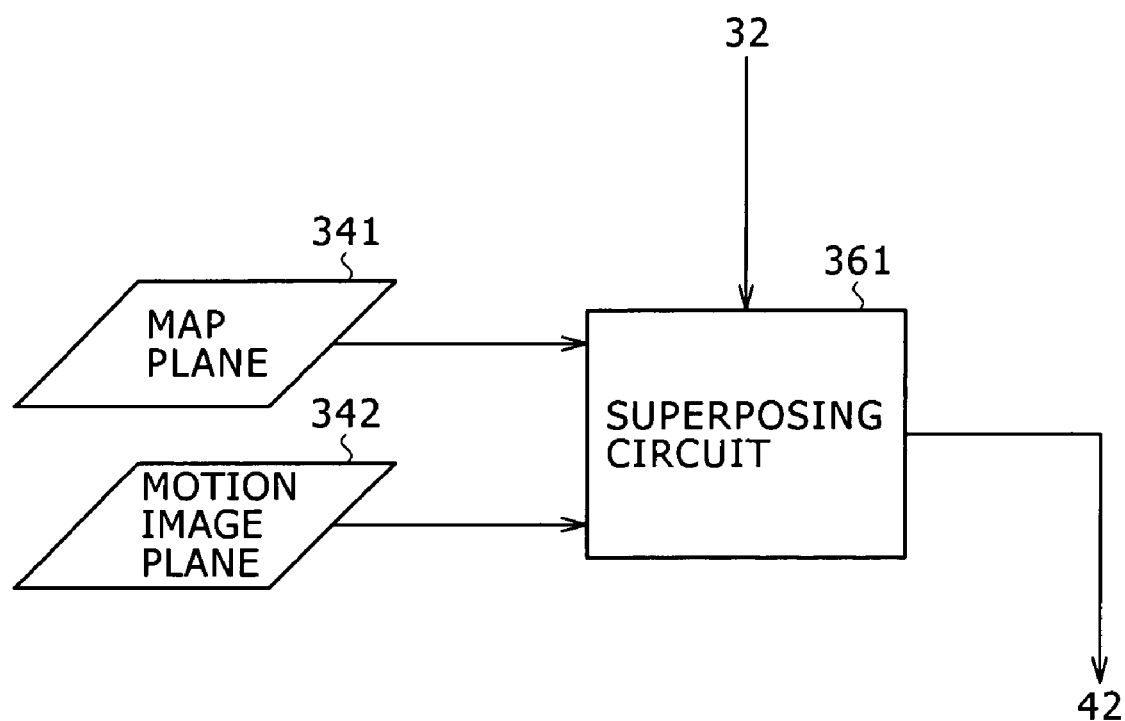
FIG. 8 is a view showing an example configuration of a display controller section 36 according to the embodiment of the present invention.

FIG. 8 is a view showing an example configuration of the display controller section 36 according to the embodiment of the present invention. Not only such the map as shown in FIG. 7, but also a playback screen of a motion image signal is displayed on the display section 42. In this event, it is preferable not only to separately display the motion image and the map, but also to display both at the same time. For this reason, a superposing circuit 361 is provided in the display controller section 36, whereby a map plane 341 of a map-related information rendered is superposed on a motion image plane 342 displaying a motion image, and then the superposed images are displayed on the display section 42. Example displays are shown in FIGS. 9 and 10.

Figure 9:
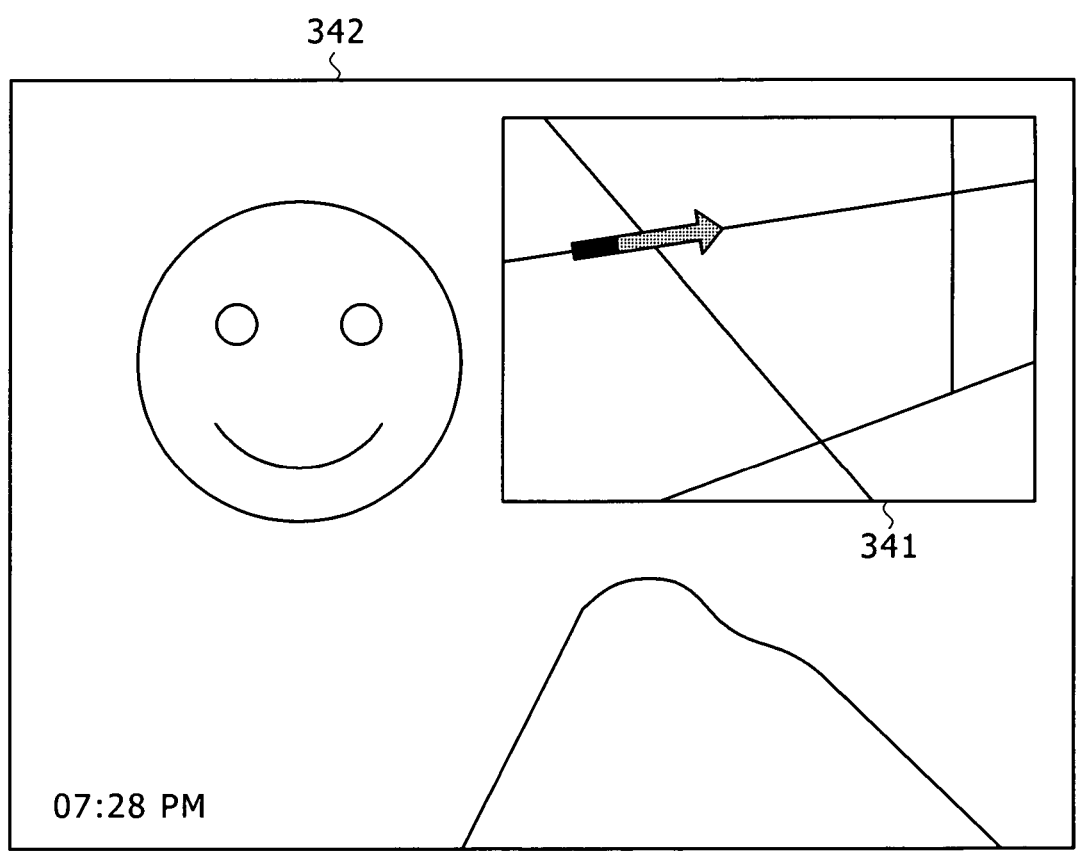
FIG. 9 is an example screen display formed by superposition according to the embodiment of the present invention.
Figure 10:
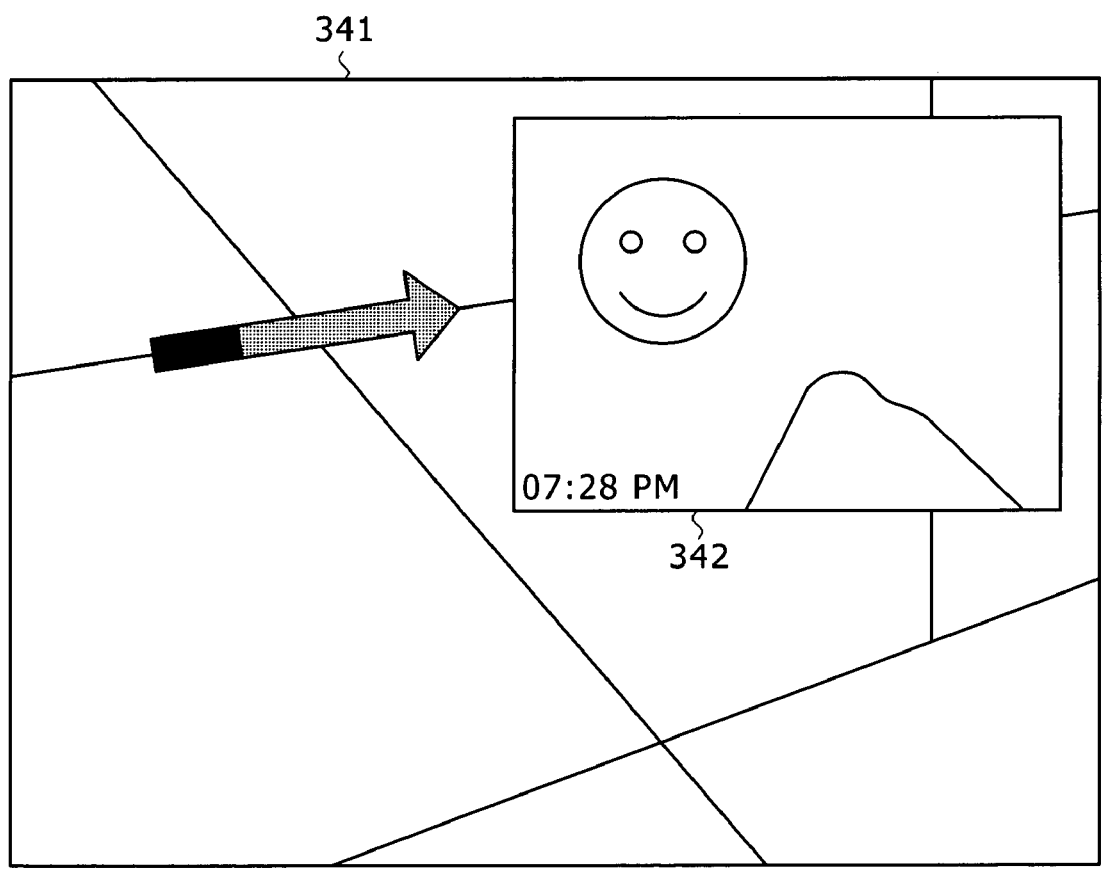
FIG. 10 is another example screen display formed by superposition according to the embodiment of the present invention.

FIG. 9 is an example of a screen display formed by superposition according to the embodiment of the present invention. In the example display, the display is performed in the manner that the map plane 341 is superposed on the motion image plane 342.

The map plane 341 displays by an arrow mark to indicate a route along which a motion image being played back on the motion image plane 342 has been captured. In the example display, the route of the entirety of the motion image data recorded in the file is displayed in the range from the start point (tail) of the arrow mark on the map plane 341 to the end point (lead edge) thereof, and a current playback position is shown by a variation of the pattern in the arrow. More specifically, the segment of the pattern of the arrow mark appearing on the map plane 341 corresponds to the current playback position. Thereby, the user becomes able to easily know the image capture route of the motion image, and is further able to visually verify the position of the entirety of the image currently being played back.

In the example display, the route of the entirety of the motion image data is thus indicated by the arrow mark appearing on the map plane 341. However, the entirety of the motion image data need not thus be indicated, but an actual playback portion may be indicated by the arrow. In this case, the arrow mark appearing on the map plane 341 extends in synchronism with playback of the motion image on the motion image plane 342.

FIG. 10 is another example screen display formed by superposition according to the embodiment of the present invention. In the example display, display is performed in the manner that the motion image plane 342 is superposed on the map plane 341. Shift is can be made between the example display of FIG. 9 and the example display of FIG. 10 in accordance with an instruction made through the operation input section 41. For example, a case is contemplated wherein, in the state of the display of FIG. 9, a shift to the example display of FIG. 10 is specified when a more detailed display is necessary.

In the example display of FIG. 10, although the arrow mark indicative of the playback position on the map plane 341 is located in an upper left portion of the screen, but the lead end of the arrow mark may be located at the center of the screen, for example. In the display arrangement where, as described above, the arrow mark extends in synchronism with playback of the motion image, an undesirable case takes place where the arrow mark is hidden underneath the map plane 341. However, in the display arrangement where the lead end of the arrow mark is all time located in the center of the screen, such the undesirable case where the arrow mark is hidden underneath the map plane 341 does not take place, and the user is enabled to easily verify the position currently being played back.

Figure 11:
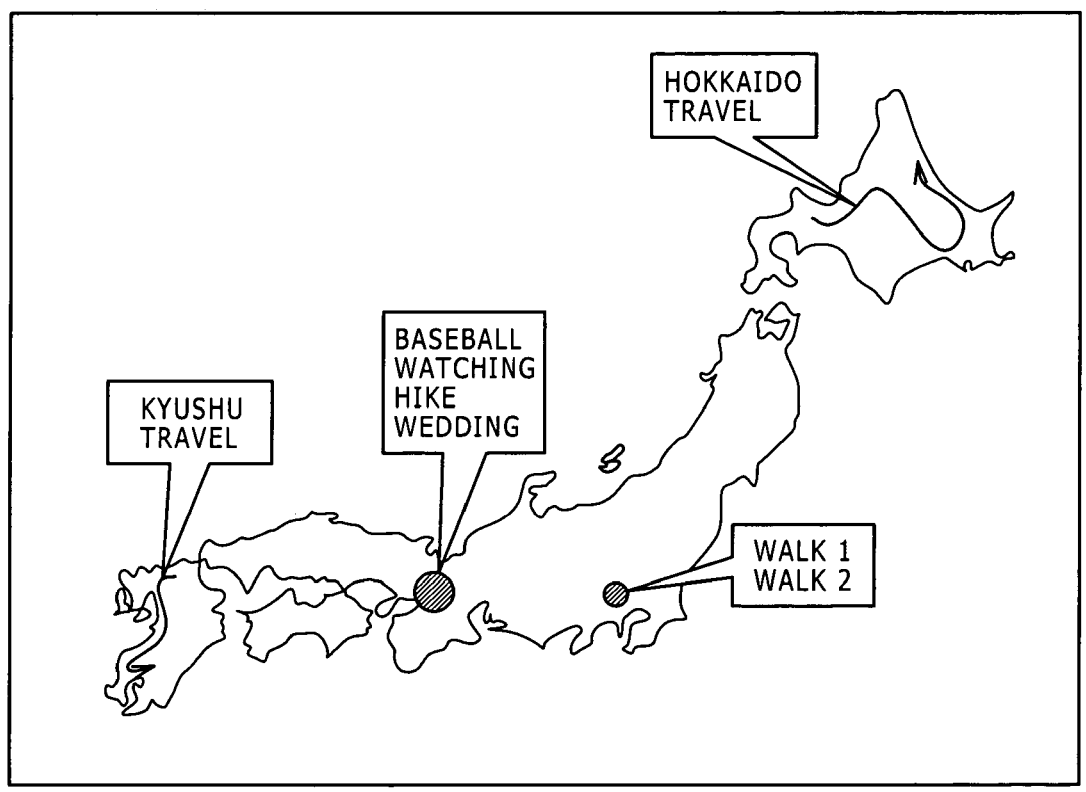
FIG. 11 is a view showing a display pattern of a history of position information according to the embodiment of the present invention.

FIG. 11 is a view showing a display pattern of a history of position information according to the embodiment of the present invention. In the case of capturing motion images, the history can largely differ depending on the characteristic of the respective content of the respective one. For example, when the movement range is wide as in the case of a "Hokkaido travel" or "Kyushu travel" shown in FIG. 11, the image-capture route can be sufficiently represented even in a wide area map. However, in the case where image-capture routes concentrating in a relatively local range, the image-capture routes cannot sufficiently represented in a wide area map.

Then, as in the case of, for example, a "Walk 1" of FIG. 11, in the case a route is limited to a narrow area relative to the area of a map being displayed, the route is not represented by an arrow, but a circular indication is displayed. The size of the circular indication can be set proportional to a maximum value of the movement distance. Alternatively, the size may be set corresponding to the number files included in the area. Titles corresponding to the circular indication may be displayed only when the area is selected through the operation input section 41 (when a mouse pointer exist over the area).

As a reference to determine whether or not to perform the circular indication, it is set as follows. In a map in the size of M (vertical)×N (horizontal), for example, when the maximum width of a vertical movement range is less than M/k, and concurrently when the maximum width of a horizontal movement range is less than N/k, the history is circularly indicated. For k being set as a reference, a value ranged from about 10 to about 20 can be selected. Alternatively, the history may be circularly indicated when a value obtained by the addition of the square of the maximum width of the vertical movement distance and the square of the maximum width of the horizontal movement distance is less than (M2+N2)/k2.

Figure 12:
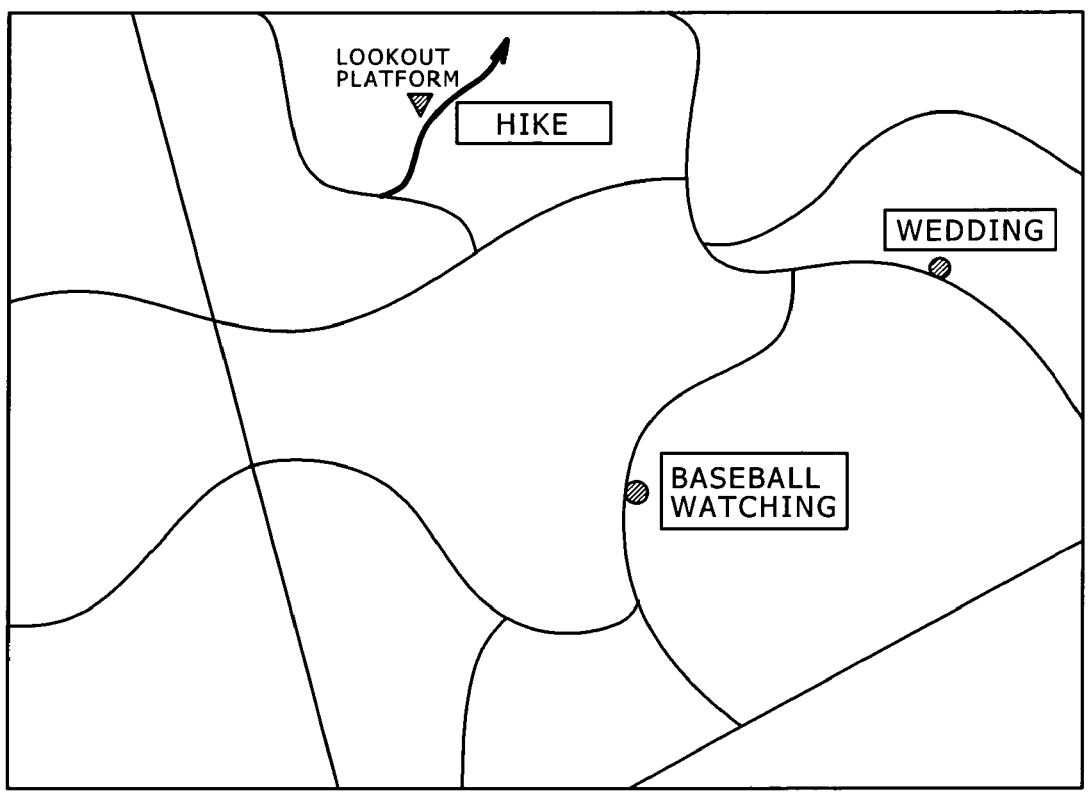
FIG. 12 is a view showing another display pattern of a history of position information according to the embodiment of the present invention.

FIG. 12 is a view showing another display pattern of a history of position information according to the embodiment of the present invention. In a map of FIG. 11, when a circular portion with the indication of "Baseball watching, Hike, Wedding" is specified through the operation input section 41 (by being clicked with the mouse, for example, the map is displayed in the form of an enlarged map as shown in FIG. 12.

In the example display, for the route present in a relatively wide range, such as in the case of "Hike," with respect to the area of the map as a reference, the position information is displayed by an arrow mark. On the other hand, for that as in the case of, for example, "Baseball watching" or "Wedding" located in substantially a constant position or limited to a local area, a circular indication is displayed similarly as in FIG. 11. A reference for determining whether to display the circular indication is the same as the case of FIG. 11.

In the case shown in FIG. 12, the arrow mark and circular indications each correspond to one file. As such, when any one of the indications is specified through the operation input section 41, playback of the corresponding file starts. When the arrow mark indication is specified (clicked), playback of the motion image signal in the file is performed from the position of a scene (unitary image) corresponding to the clicked position, similarly as in the case of FIG. 7 occurs. On the other hand, the circular indication is specified, playback of the motion image signal is performed from a predetermined position (top, for example) of the file.

In this manner, in the embodiment of the present invention, the files containing the motion image data can be visually managed in accordance with the position information displayed on the map.

Figure 13:
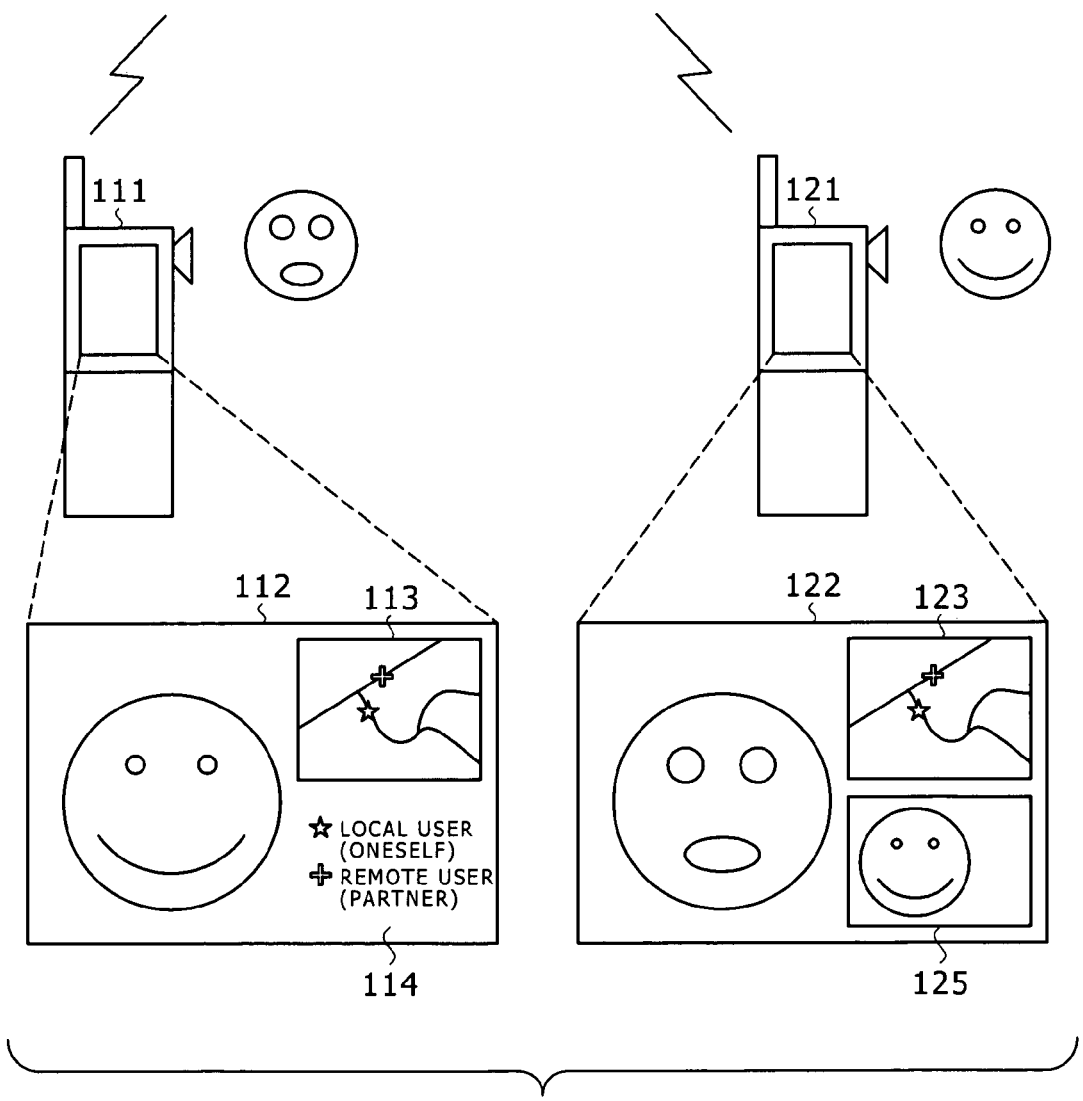
FIG. 13 is a view showing an example operation of real time display between mobile devices according to the embodiment of the present invention.

FIG. 13 is a view showing an example wherein real time display is performed between mobile devices according to the embodiment of the present invention. According to the present invention, not only playback of coded data recorded in the disk 49, but also communication of coded data (i.e., MPEG-2 PS) can be performed in real time through the communication device 60.

During communication between the mobile devices 111 and 121, the screen of the mobile device 111 displays a motion image 112, which has been captured by the mobile device 121, and a map 113 including the current positions of the devices. As shown in a descriptive display 114 also, marks representing the current positions of the mobile devices 111 and 121 are displayed on the map 113. In addition, when the mobile device 111 or 121 is moved in the course of the communication, the trajectory is indicated by a thick line. In specific, a mark representing the current position at the lead end of the thick line representing the movement trajectory is displayed.

The screen of the mobile device 121 similarly displays a motion image 122, captured by the mobile device 111, and a map 123 of the current positions of one another. The screen enables the users of the mobile devices 111 and 121 to mutually recognize their expressions of communication partners and to easily verify the positional relationships with one another.

The above may be such that the screen of each of the mobile devices displays not only the motion image sent from the partner's mobile device, but also an image captured by the own mobile device (such as an image capture image 125 in the mobile device 121), thereby to enable it to verify the quality of the image. In addition, FIG. 13 shows the cases wherein the motion image is displayed in a large size, however, the arrangement may be such that as in the example of FIG. 10, the display is appropriately shiftable to display the map in a large size map or to display only the map.

Thus, according to the embodiment of the present invention, it is possible to record files containing motion image data into the recording medium and use them. Not only that, but also it is possible to verify in real time the positional relationship with the communication partner on the on the map in the manner that the position information is correlated to the motion image signal and transmitted through the communication device 60.

A map acquiring method according to the embodiment of the present invention will now be described herebelow.

When the range of a map to be displayed as in the present invention is undetermined, the range of the map to be prepared is preliminarily unknown. This is because the movement range of a user is not predicable. As such, for a mobile device being used in Japan, maps covering all corners of Japan in detail should be prepared. Such maps may be preliminarily provided in the respective mobile device, but can be acquired from the outside through communication in a manner described below.

To simplify the description, a case is herein contemplated such that movement takes place from a radio wave region A, which receives the radio wave generated by a base station A, to a radio wave region B, which receives the radio wave generated by the base station B. When having entered the radio wave region A, which receives the radio wave generated by the base station A, a user having a mobile device according to the embodiment of the present invention establishes communication with the base station A for connection thereto. In this case, map data in a range slightly wider than an ultimate range of the radio wave being generated from the base station A is transmitted from the base station A to the mobile device, whereby the device receives the map data. Then, when having moved to a radio wave region C whereat the radio waves from the base station A and the base station B are mixedly flowing, the mobile device communicates with the base station A, thereby to receive the radio wave from the base station B. When the intensity of the radio wave becomes higher than that of the radio wave from the base station A, a handover occurs to shift the radio wave channel, thereby to shift the communication to the base station B. Then, map data in a range slightly wider than the ultimate range of the radio wave being generated from the base station A is transmitted from the base station A to the mobile device, whereby the device receives the map data.

Additionally, for the types of maps, it is possible to contemplate maps that correspond to stages in the range from a wide area, such as an overall map of Japan, to a map such as a load map covering detail portions. For maps of the same layer, a slightly wider range is set to allow boundary regions overlap with one another. For an overlap portion, processing is performed such that the mobile device removes an overlap portion of a map acquired later, performs matching, and the map is stored as a new map into memory after matching.

The method may be such that, when acquiring a map through communication, the map is received image capture in a state immediately before image. Alternatively, the method may be such that a map is received at any time and an unnecessary map is appropriately discarded in the state where power of the mobile device is turned on. In the latter case, a received map may be overwritten at any time depending on an area of a temporarily recording memory.

A map may include information regarding famous-place guides within the range of the map. In this case, when a name of a file having position information of a position proximate to a famous place of the guide is registered to a keyword 894 of the file management table, it can be used in the event of future retrieval. In addition, a file including motion image data of a famous-place guide is may be received together with a map, thereby to register the file as an independent file into the file management table. In this case, the arrangement can be made such that the motion image data of the famous-place guide is played back by clicking an icon or the like of the famous-place guide on the map.

In the embodiment of the present invention, although the position information is retained in the coded data, the range of the position information may be preliminarily registered into the file management table.

Next, operation according to the embodiment of the present invention will be described below.

Figure 14:
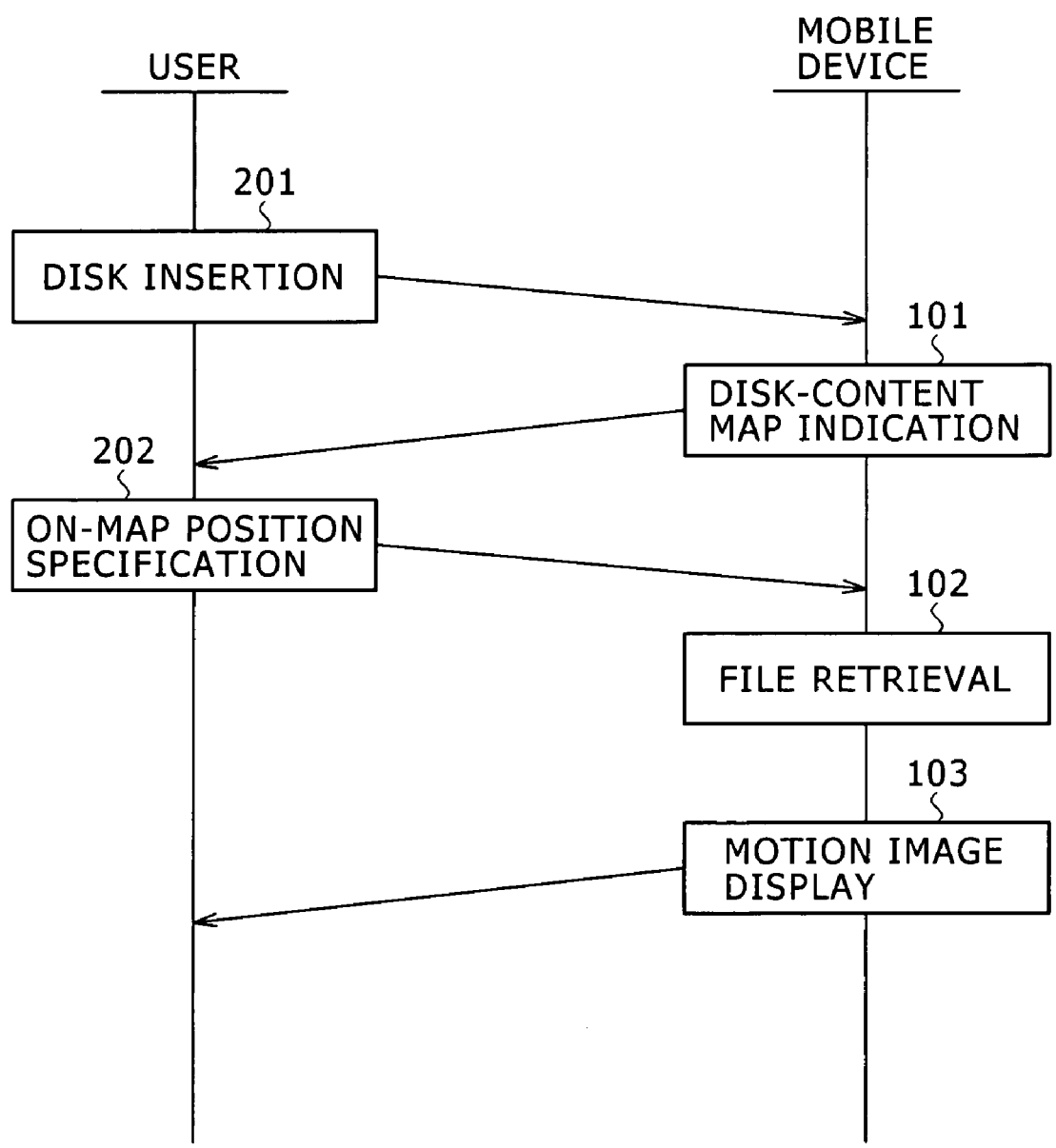
FIG. 14 is a view descriptive of interactive operation between a mobile device and a user according to the embodiment of the present invention.

FIG. 14 is a view descriptive of interactive operation between a mobile device and a user according to the embodiment of the present invention. At the outset, a user inserts the disk 49, which contains position information according to the embodiment of the present invention, into the mobile device 100, or alternatively, issues a request through the operation input section 41 for mounting or reloading of the disk 49 (201). In response, the mobile device 100 reads the file management table, described in conjunction with FIG. 6, from the disk 49, renders position information corresponding to a respective file in the file management table on a map, and displays the map on the display section 42 (101).

On the map displayed on the display section 42, the user specifies an indication of position information (arrow mark indication or circular indication such as described above) by using the operation input section 41 (202). In response, the mobile device 100 accesses the corresponding file contained in the disk 49, thereby to perform playback of the motion image signal from a predetermined position (103). Thus, the user can easily accesses the motion image from the position information on the map.

Figure 15:
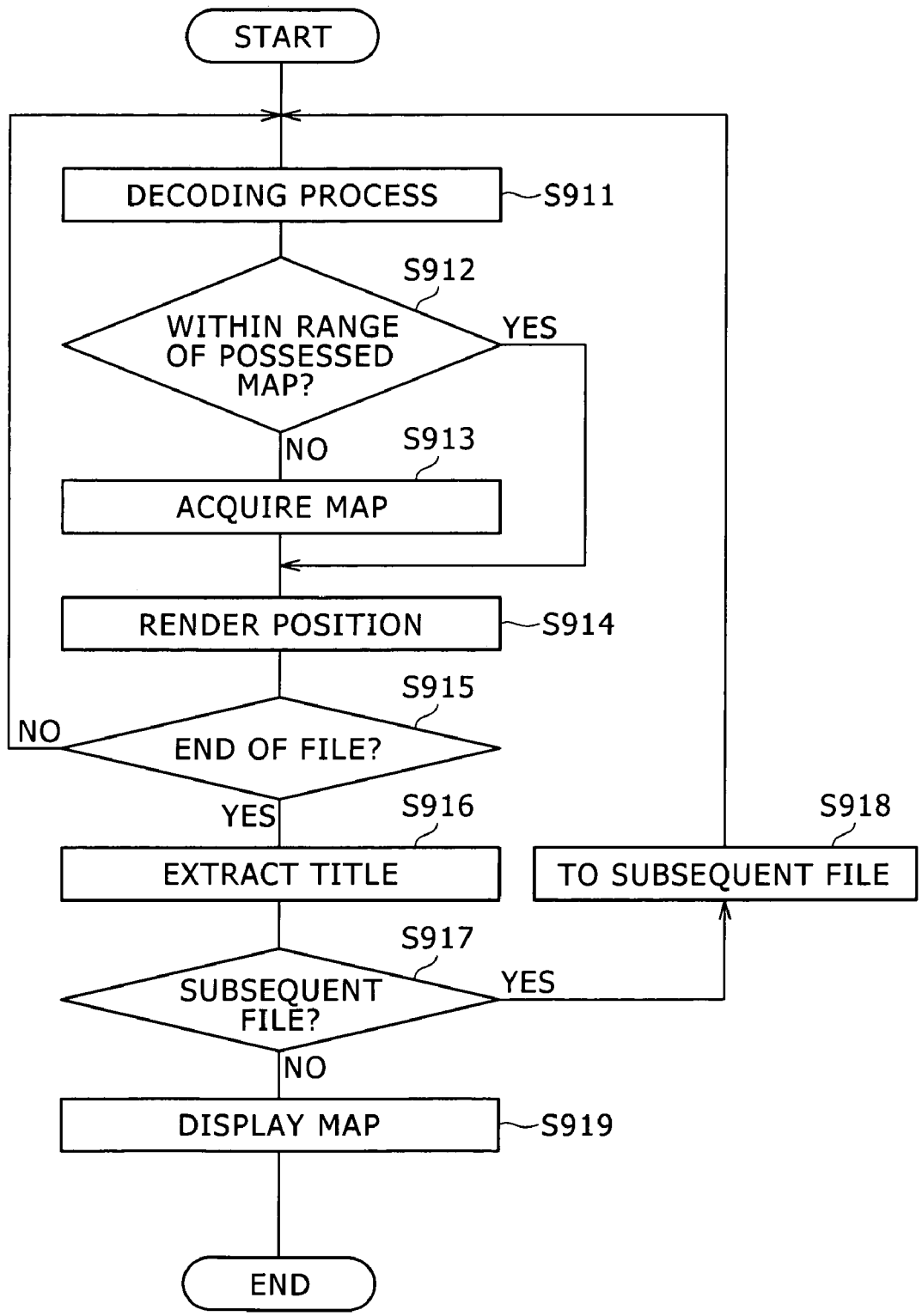
FIG. 15 is a diagram showing a procedure for the process of displaying the overall content of a disk according to the embodiment of the present invention.

FIG. 15 is a diagram showing a procedure for processing of displaying the overall content of a disk according to the embodiment of the present invention. That is, FIG. 15 shows the procedure for the process 101. In accordance with the file management table, the mobile device 100 reads the content of a file in the disk 49 in units of the video object unit (VOBU), and the coding/decoding circuit 21 performs the decoding process (step S911). Thereby, the position information correlated to the motion image signal can be acquired.

Then, it is determined whether or not the range of the position information thus acquired falls within the range of the map previously acquired (step S912). If it is determined that the range does not fall within the map previously acquired, then the device acquires a necessary map through the communication device 60 (step S913).

The mobile device 100 renders the position information of the video object unit on the map (step S914). Then, the processes of steps S911 to S914 are iterated until completion of a last video object unit at the end of the file (step S915).

Upon completion of processing to the end of the file (step S915), the mobile device 100 extracts a title 893 retained in the file management table and sets the title onto the position information on the map (step S916). If a subsequent file is present (step S917), then the operation moves to processing of the subsequent file (step S918).

If the subsequent file is not present (step S917), the mobile device 100 displays on the display section 42 the map containing the position information, which having been rendered to that time (step S919).

Figure 16:
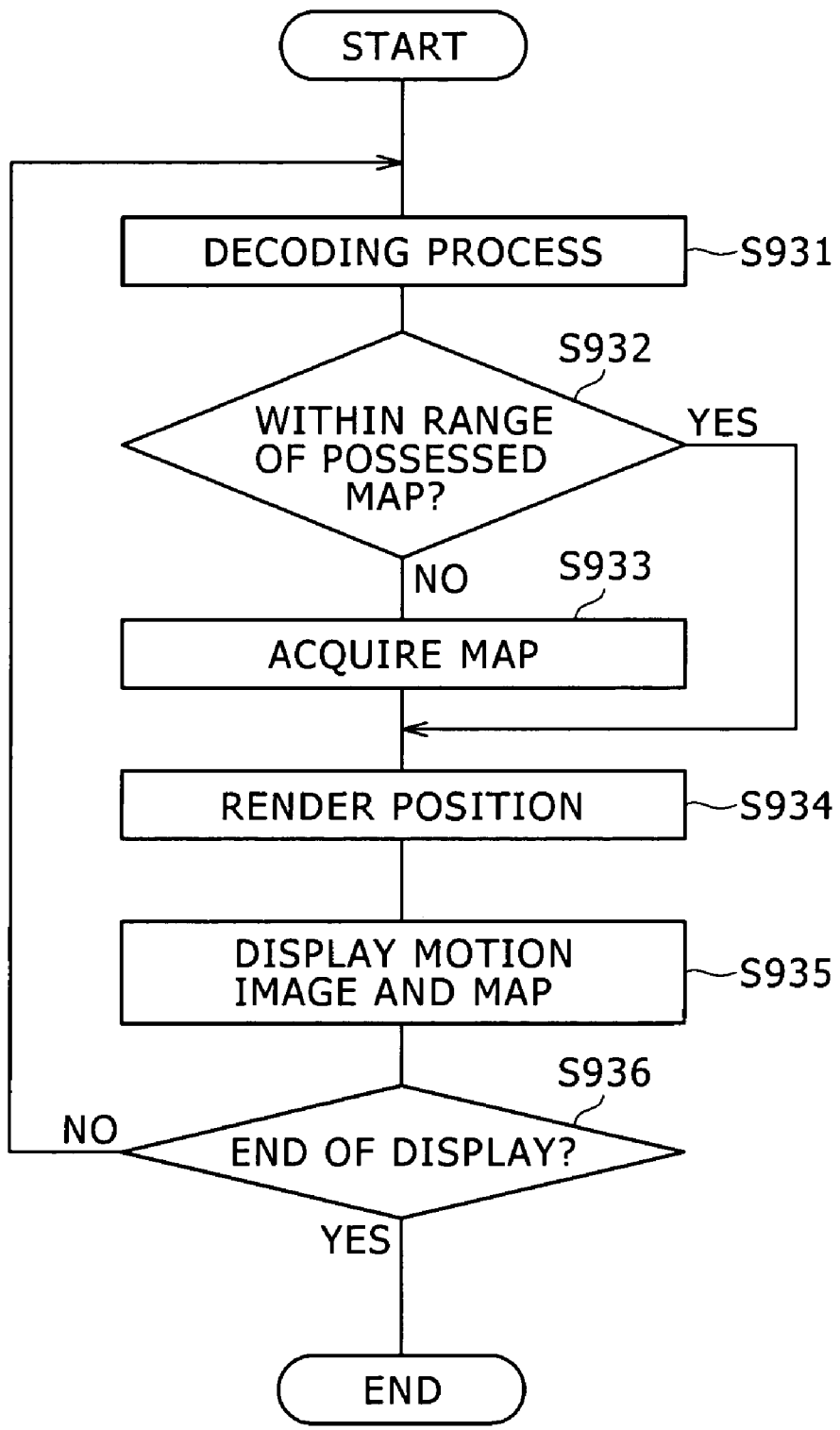
FIG. 16 is a diagram showing a procedure for the process of displaying the content of a file according to the embodiment of the present invention.

FIG. 16 is a diagram showing a procedure for processing of a displaying the content of a file according to the embodiment of the present invention. That is, FIG. 16 depicts the procedure for the process 103 shown in FIG. 14. The mobile device 100 performs the decoding process from a predetermined screen of a specified file (step S931). Thereby, the position information correlated to the motion image signal can be acquired. When the arrow mark indication is specified, the above-mentioned predetermined screen refers to a screen corresponding to the indicated position. In the case of a file corresponding to the circular indication, the predetermined screen can be specified to be a first screen of the file, for example.

Then, it is determined whether or not the range of the position information thus acquired falls within the range of the map previously acquired (step S932). If it is determined that the range does not fall within the map in possession, then the device acquires a necessary map through the communication device 60 (step S933).

The mobile device 100 renders the position information of the video object unit on the map (step S934), and displays the map and the motion image on the display section 42 (step S935). The mobile device 100 iterates the above-described processes to the end of the motion image data or until termination of playback is specified by the user (step S936).

In this manner, according to the embodiment of the present invention, in the coding/decoding circuit 21, the time stamp PTS is set for the unitary image and position information of the motion image signal and correlated to one another. Thereby, an image capture trajectory of the motion image can be displayed on the map in accordance with the position information.

As above, the embodiment of the present invention has been described with reference to the example wherein the GPS is used to acquire the position information. However, in lieu of using the GPS, the position information may be specified in the manner that radio waves are received from three base stations to thereby make a three-point positional determination. In this case, the distance measurement can be implemented by measuring the amount of time used until the arrival of a signal (field synchronization signal of an image over the radio wave).

In addition, while the embodiment of the present invention represents one example for embodying the present invention, and has correlations to invention definition items in the claims, as described below, the present invention is not limited thereto, but various modifications and alterations may be made without departing the scope and spirit of the invention.

In specific, in claim 1, the image capturing means corresponds to, for example, the camera section 10. The position information acquiring means corresponds to, for example, the GPS module 50. The motion image coding means corresponds to, for example, the image coding section 2110. In addition, the multiplexing means corresponds to, for example, the multiplexing section 2140.

In claim 2, the system time generating means corresponds to, for example, the system time generator section 2150.

In claim 3, the image capturing means corresponds to, for example, the camera section 10. The position information acquiring means corresponds to, for example, the GPS module 50. The motion image coding means corresponds to, for example, the image coding section 2110. The system time generating means corresponds to, for example, the system time generator section 2150. The multiplexing means corresponds to, for example, the multiplexing section 2140. The recording means corresponds to, for example, the disk interface 23 or the memory card interface 37.

In claim 4, the image decoding means corresponds to, for example, the image decoding section 2171. The display means corresponds to, for example, the display section 42.

In claim 5, the operation input means corresponds to, for example, the operation input section 41.

In claim 6, the image decoding means corresponds to, for example, the image decoding section 2171. The superposing means corresponds to, for example, the superposing circuit 361.

In claim 7, the communication means corresponds to, for example, the communication device 60.

In claim 9, the separating means corresponds to, for example, the separator section 2160. The image decoding means corresponds to, for example, the image decoding section 2171. The output means corresponds to, for example, the controller section 3290 and the buffers 2181 and 2183. The superposing means corresponds to, for example, the superposing circuit 361.

In claim 10, the image capturing means corresponds to, for example, the camera section 10. The position information acquiring means corresponds to, for example, the GPS module 50. The motion image coding means corresponds to, for example, the image coding section 2110. The multiplexing means corresponds to, for example, the multiplexing section 2140. The recording means corresponds to, for example, the disk interface 23. The separating means corresponds to, for example, the separator section 2160. The image decoding means corresponds to, for example, the image decoding section 2171. The output means corresponds to, for example, controller section 3290 and the buffer 2181 and 2183. The superposing means corresponds to, for example, the superposing circuit 361.

In claim 11 or 15, the step of capturing the motion image to thereby generate the motion image data corresponds to, for example, the process by the camera section 10. The step of acquiring the position information indicative of the position whereat the motion image has been captured corresponds to, for example, the process by the GPS module 50. The step for coding the motion image corresponds to, for example, the process by the image coding section 2110. The step of performing multiplexing by correlating the respective position information corresponding to at least one unitary image in the coded motion image data corresponds to, for example, the process by the multiplexing section 2149. The step of outputting the multiplexed data corresponds to, for example, the process by the disk interface 23 or the communication interface 38.

In claim 12, the step of capturing the motion image to thereby generate the motion image data corresponds to, for example, the process by the camera section 10. The step of acquiring the position information indicative of the position whereat the motion image has been captured corresponds to, for example, the process by the GPS module 50. The step of coding the motion image corresponds to, for example, the process by the image coding section 2110. The step of multiplexing by correlating the respective position information corresponding to at least one unitary image in the coded motion image data corresponds to, for example, the process by the multiplexing section 2149. The step of recording the multiplexed data into the recording medium corresponds to, for example, the process by the disk interface 23 or the memory card interface 37.

In claim 13 or 16, the step of decoding the motion image data for the data created by the correlation between the coded motion image data and the position information corresponding to the respective unitary image of the motion image data corresponds to, for example, step S931. The step of rendering the position information on the map corresponds to, for example, step S934. The step of displaying the motion image including the unitary image correlated to the position information together with the map corresponds to, for example, step S935.

In claim 14 or 17, the step of decoding the motion image data for the data created by the correlation between the coded motion image data and the position information corresponding to at least one unitary image of the motion image data corresponds to, for example, step S931. The step of, when a map corresponding to the position information is not possessed, acquiring the map corresponds to, for example, step S933. The step of rendering the position information on the map corresponds to, for example, step S934. The step of displaying the motion image containing the unitary image correlated to the position information, together with the map corresponds to, for example, step S935.

The process steps or procedure described in conjunction with the embodiment of the present invention may be taken as a method including a series of the steps. Alternatively, the processing steps or procedure may be construed as a program that causes a computer to execute the series of the process steps and a recording medium storing the program.

INDUSTRIAL APPLICABILITY

As apparent from the above description, according to the present invention, an advantage can be obtained in that the respective unitary information of the coded time series information and the position information are correlated to one another, and the trajectory of the time series information can be displayed on the map in accordance with the position information.

The invention claimed is:

1. An information generating apparatus comprising:
   image capturing means that captures a motion image to thereby generate motion image data;
   position information acquiring means that acquires position information indicative of a position where the motion image has been captured;
   motion image coding means that codes the motion image data; and
   multiplexing means that performs multiplexing by correlating the respective position information corresponding to at least one unitary image in the coded motion image data.

2. An information generating apparatus according to claim 1, further comprising:
   system time generating means that generates a system time, wherein the multiplexing means adds the system time common to the corresponding unitary image and position information thereto to thereby correlate the unitary image and the position information.

3. A recording apparatus comprising:
   image capturing means that captures a motion image, thereby to generate motion image data;
       position information acquiring means that acquires position information indicative of a position where the motion image has been captured;
       motion image coding means that codes the motion image data;
       system time generating means that generates a system time;
       multiplexing means that, for the motion image data coded by adding the system time common to at least one unitary image and the position information corresponding to the unitary image thereto, performs multiplexing by correlating the unitary image and the position information; and
   recording means that records the multiplexed data into recording medium.

4. A playback apparatus comprising:
   image decoding means that, for data wherein coded motion image data and position information corresponding to at least one unitary image of the motion image data are correlated to one another, performs decoding of the motion image data; and
   displaying means that correlates the position information, which is correlated to the decoded motion image data, and a representative image of the motion image data, and performs display thereof on a map.

5. A playback apparatus according to claim 4, further comprising:
   operation input means that receives an operation from the outside, wherein when a specification of the representative image is input by the operation input means, the displaying means displays the motion image data in from the unitary image.

6. A playback apparatus further comprising:
   image decoding means that, for data wherein coded motion image data and position information corresponding to at least one unitary image of the motion image data are correlated to one another, performs decoding of the motion image data; and
   superposing means that performs display by superposing a motion image played back in accordance with the decoded motion image data and a map indicating the position information corresponding to the motion image played back.

7. A playback apparatus according to claim 6, further comprising:
   communication means for acquiring the map.

8. A playback apparatus according to claim 6, wherein the map contains famous-place information on a corresponding area.

9. A playback apparatus comprising:
   separating means that, for data wherein at least one unitary image in coded motion image data and position information corresponding to the unitary image are correlated by a common presented time and are thereby multiplexed, separates the motion image data and the position information from one another;
   image decoding means that decodes the separated motion image data;
   output means that outputs the separated position information and the unitary image of the decoded motion image data including the presented time common to the position information; and
   superposing means that performs display by superposing a map indicating the output position information and a motion image containing the output unitary image.

10. A recording and/or playback system comprising:
    a recording apparatus for recoding data containing motion image data into a recording medium, the recording apparatus including,
        capturing means for capturing a motion image to thereby generate the motion image data,
        position information acquiring means for acquiring position information indicative of a position where the motion image has been captured,
        motion image coding means for coding the motion image data, multiplexing means for multiplexing by correlating at least one unitary image and the position information corresponding to the unitary image in the coded motion image data, and recording means for recording the multiplexed data into the recording medium; and a playback apparatus for performing playback of the motion image data included in the data recorded in the recorded medium, the playback apparatus including, separating means for separating data recorded in the recording medium into the coded motion image data and the position information, image decoding means for decoding the coded motion image data, output means for outputting the separated position information and a unitary image of motion image data correlated to the position information, and superposing means for displaying by superposing a map indicating the output position information and a motion image containing the output unitary image.

11. An image processing method comprising:

capturing a motion image with an image processing device to thereby generate motion image data;

acquiring position information indicative of a position where the motion image has been captured; a step of coding the motion image data with the image processing device;

multiplexing by correlating the respective position information corresponding to at least one unitary image in the coded motion image data; and outputting the multiplexed data from the image processing device.

12. An image processing method characterized by comprising:

capturing a motion image with an image processing device to thereby generate motion image data;

acquiring position information indicative of a position where the motion image has been captured with the image processing device;

coding the motion image data; a step of multiplexing by correlating the respective position information corresponding to at least one unitary image in the coded motion image data; and recording the multiplexed data into a recording medium.

13. An image processing method comprising:

performing decoding of motion image data, wherein coded motion image data and position information corresponding to at least one unitary image of the motion image data are correlated to one another, at an image processing device;

rendering the position information on a map; and displaying a motion image containing a unitary image correlated to the position information, together with the map at the image processing device.

14. An image processing method comprising:

performing decoding of motion image data, wherein coded motion image data and position information corresponding to at least one unitary image of the motion image data are correlated to one another, at an image processing device;

acquiring a map, when a map corresponding to the position information is not possessed, rendering the position information on the map; and displaying a motion image containing a unitary image correlated to the position information, together with the map.

15. A computer readable storage medium encoded with computer program instructions accessed by a computer to transform the computer into an image processing device upon execution of the computer readable instructions to implement a method of image processing, comprising:

capturing a motion image with an image processing device to thereby generate motion image data;

acquiring position information indicative of a position where the motion image has been captured; a step of coding the motion image data with the image processing device;

multiplexing by correlating the respective position information corresponding to at least one unitary image in the coded motion image data; and outputting the multiplexed data from the image processing device.

16. A computer readable storage medium encoded with computer program instructions accessed by a computer to transform the computer into an image processing device upon execution of the computer readable instructions to implement a method of image processing, comprising:

capturing a motion image with an image processing device to thereby generate motion image data;

acquiring position information indicative of a position where the motion image has been captured with the image processing device;

coding the motion image data; a step of multiplexing by correlating the respective position information corresponding to at least one unitary image in the coded motion image data; and recording the multiplexed data into a recording medium.

17. A computer readable storage medium encoded with computer program instructions accessed by a computer to transform the computer into an image processing device upon execution of the computer readable instructions to implement a method of image processing, comprising:

performing decoding of the motion image data, wherein coded motion image data and position information corresponding to at least one unitary image of the motion image data are correlated to one another, at an image processing device;

rendering the position information on a map; and displaying a motion image containing a unitary image correlated to the position information, together with the map at the image processing device.

18. A computer readable storage medium encoded with computer program instructions accessed by a computer to transform the computer into an image processing device upon execution of the computer readable instructions to implement a method of image processing, comprising:

performing decoding of the motion image data, wherein coded motion image data and position information corresponding to at least one unitary image of the motion image data are correlated to one another, at an image processing device;

acquiring a map, when a map corresponding to the position information is not possessed, rendering the position information on the map; and displaying a motion image containing a unitary image correlated to the position information, together with the map.

* * * * *